July 1, 1930.   H. F. SMITH   1,769,192
GAS PRODUCER
Filed July 24, 1920   10 Sheets-Sheet 2
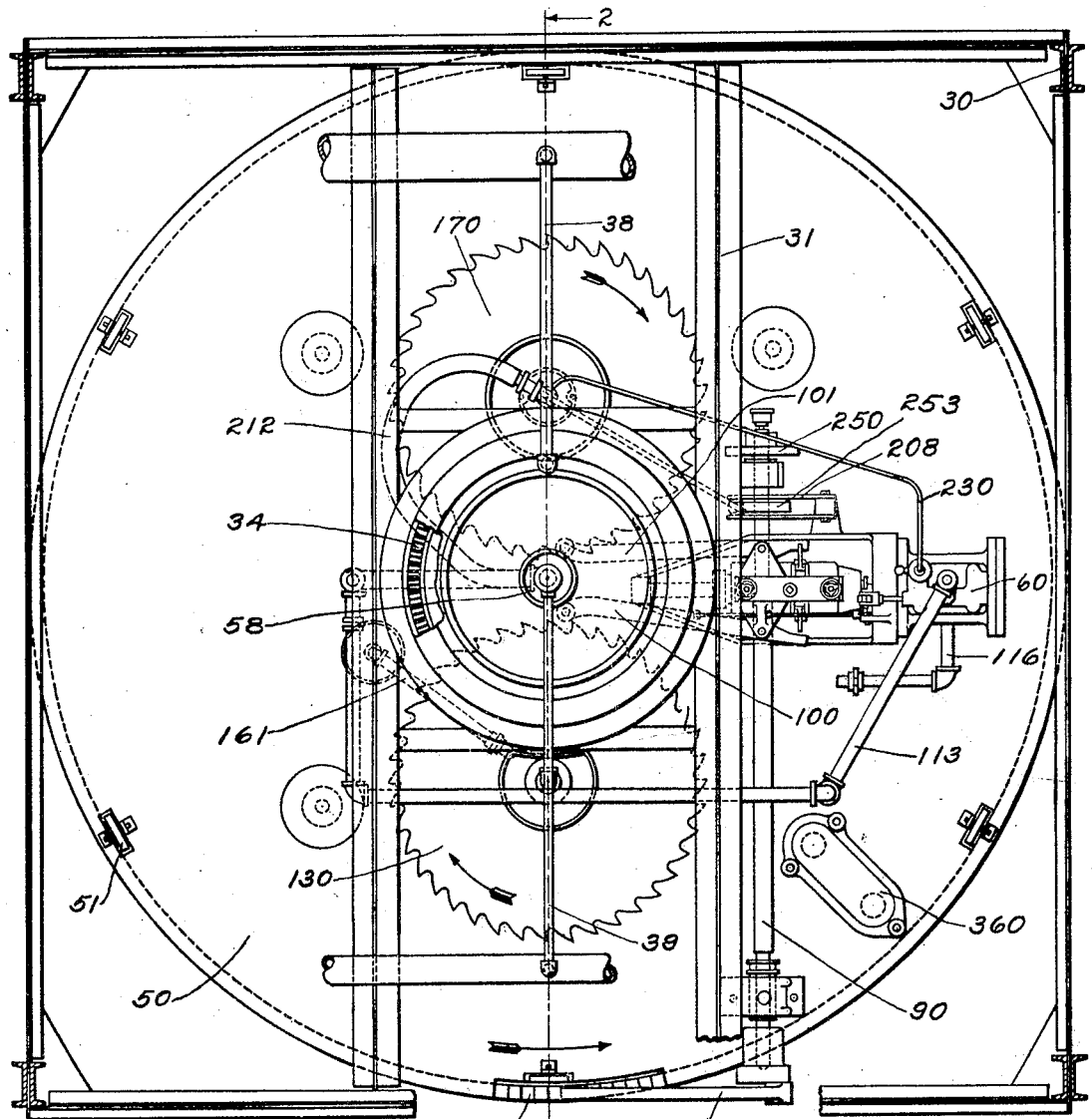
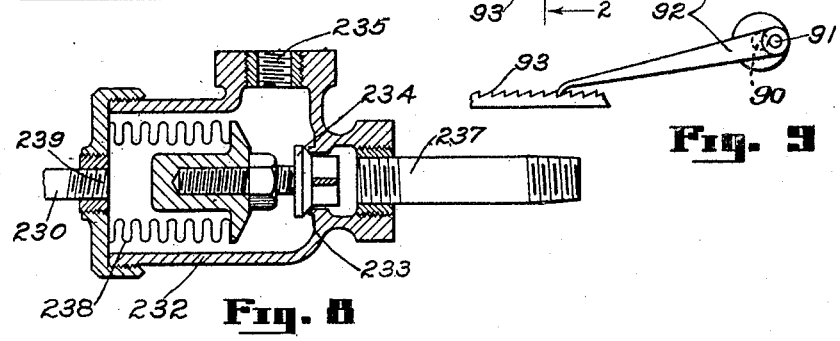
Fig. 2
Fig. 9
Fig. 8
Witnesses
Edwin James
Chas G. Graf
Inventor
Harry F. Smith
By
Attorney

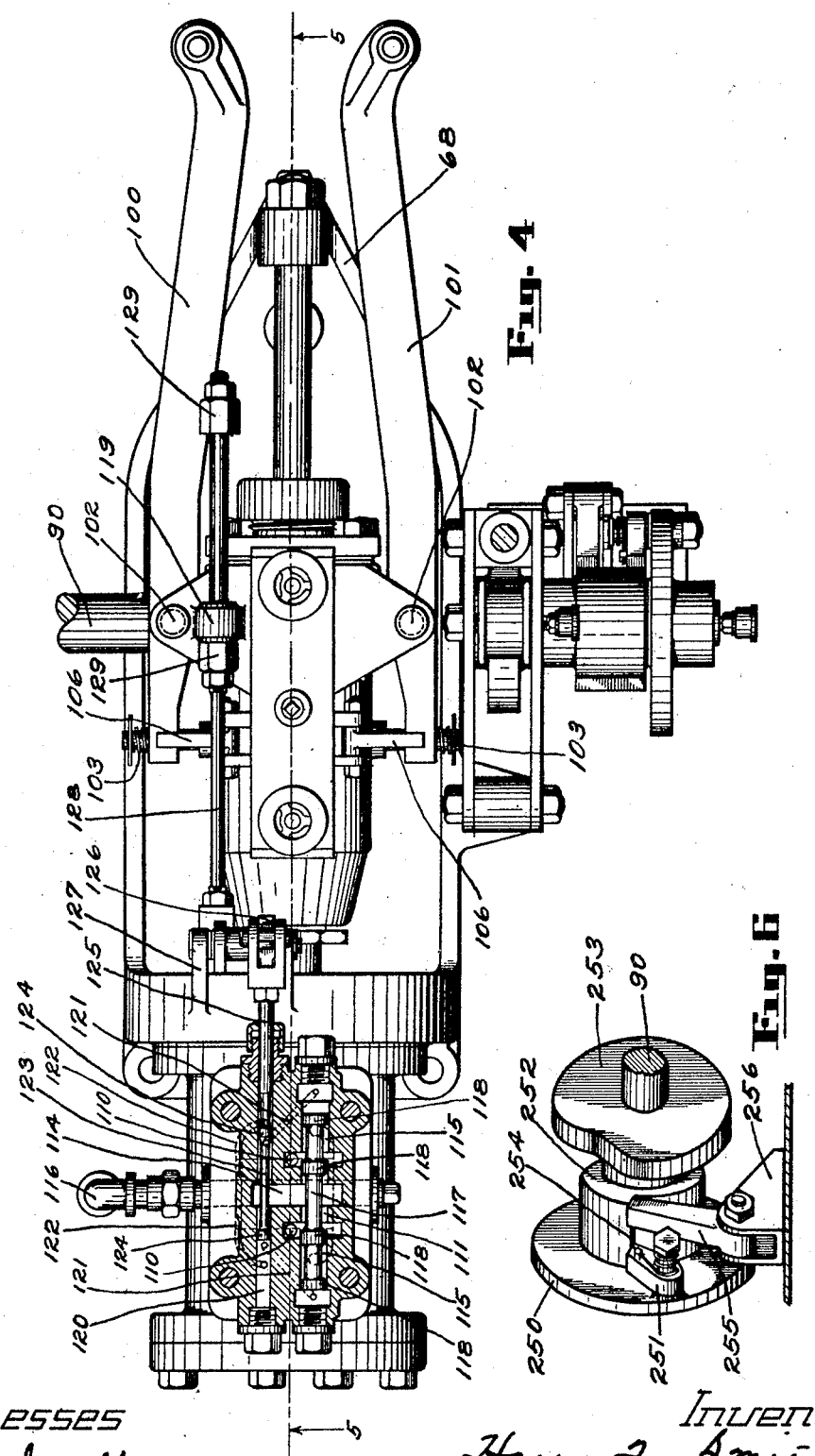

July 1, 1930.   H. F. SMITH   1,769,192
GAS PRODUCER
Filed July 24, 1920   10 Sheets-Sheet 5
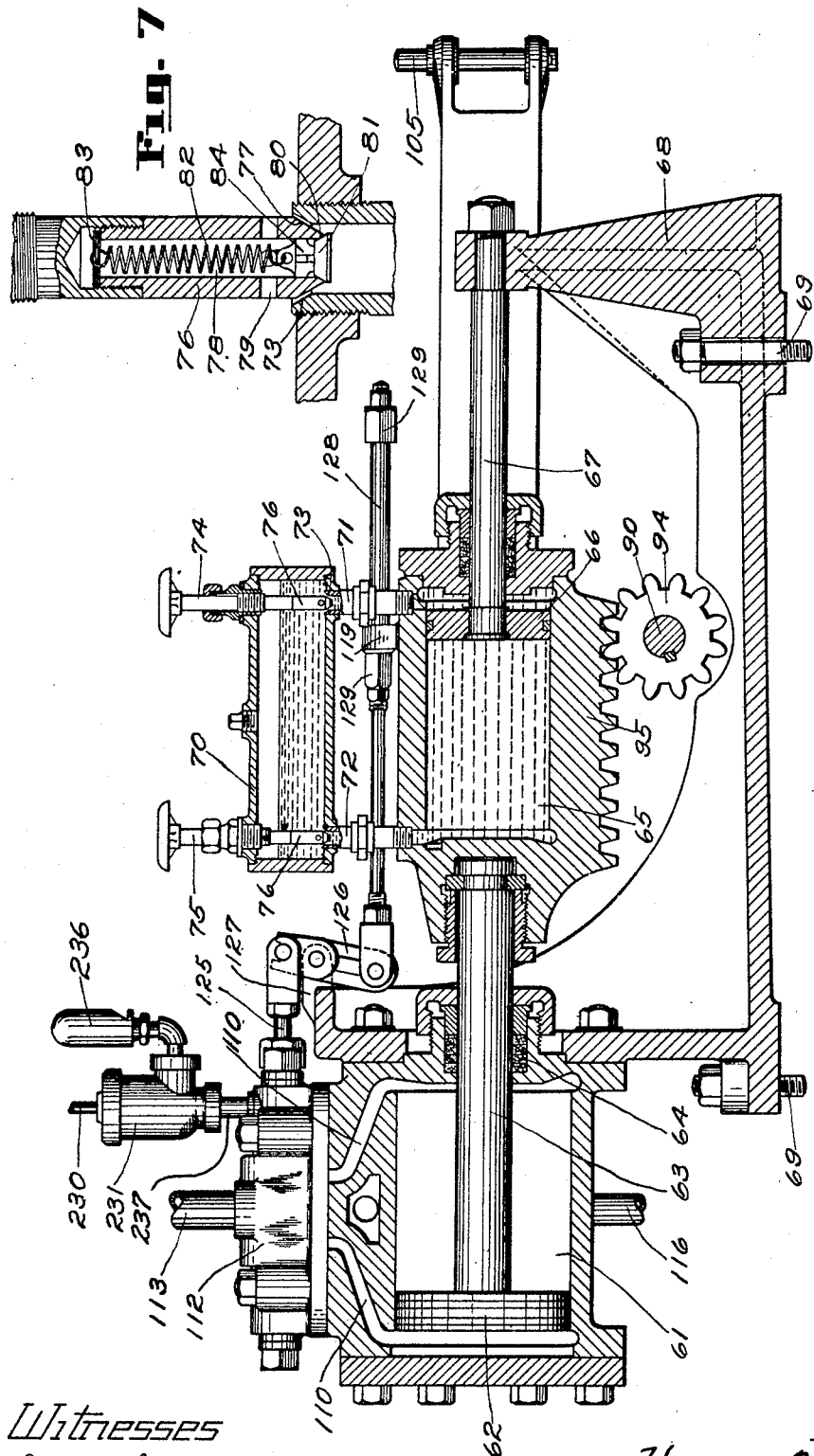
Witnesses
Edwin James
Chas. G. Graf.
Inventor
Harry F. Smith
By Geer Mauder
Attorney

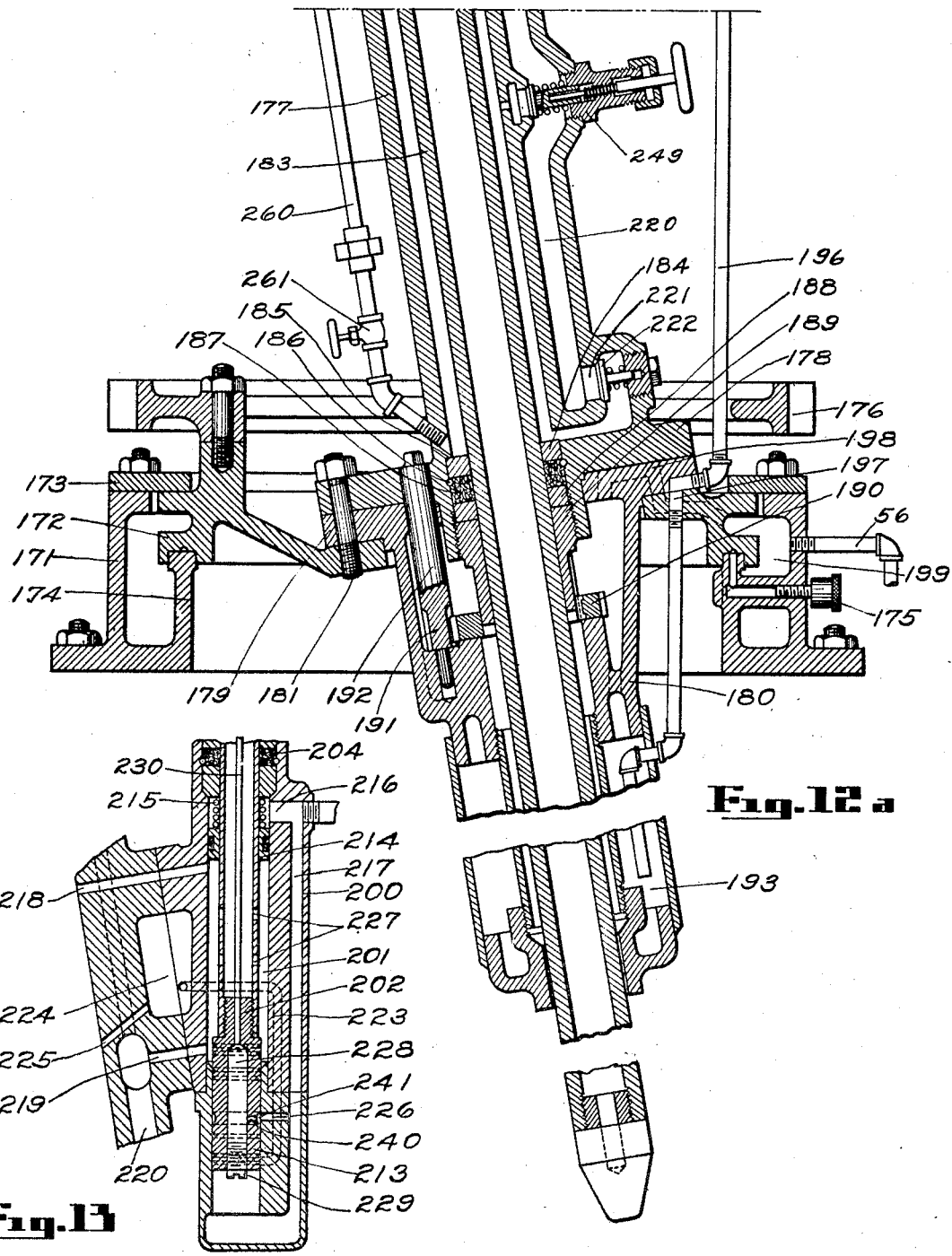

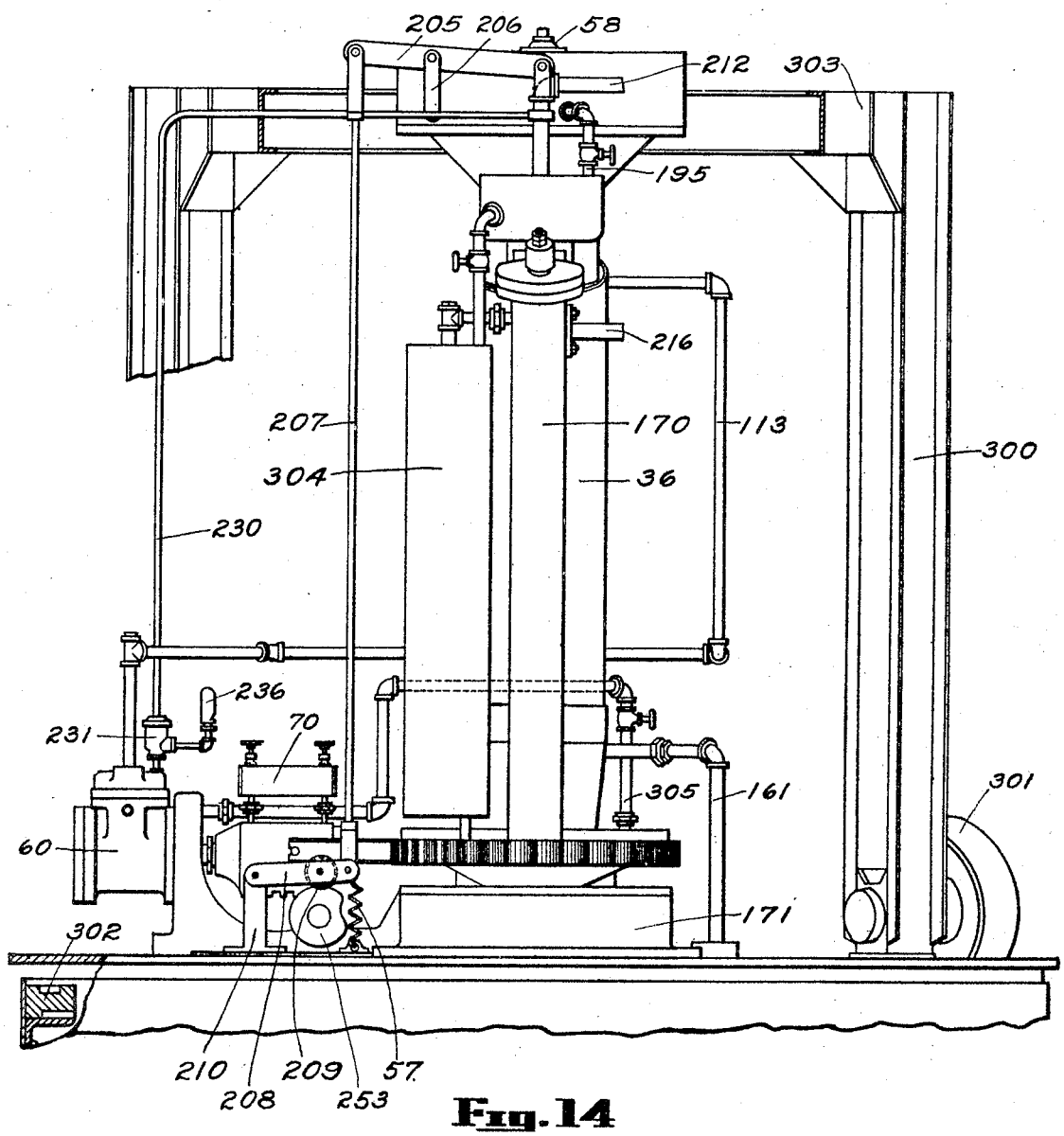

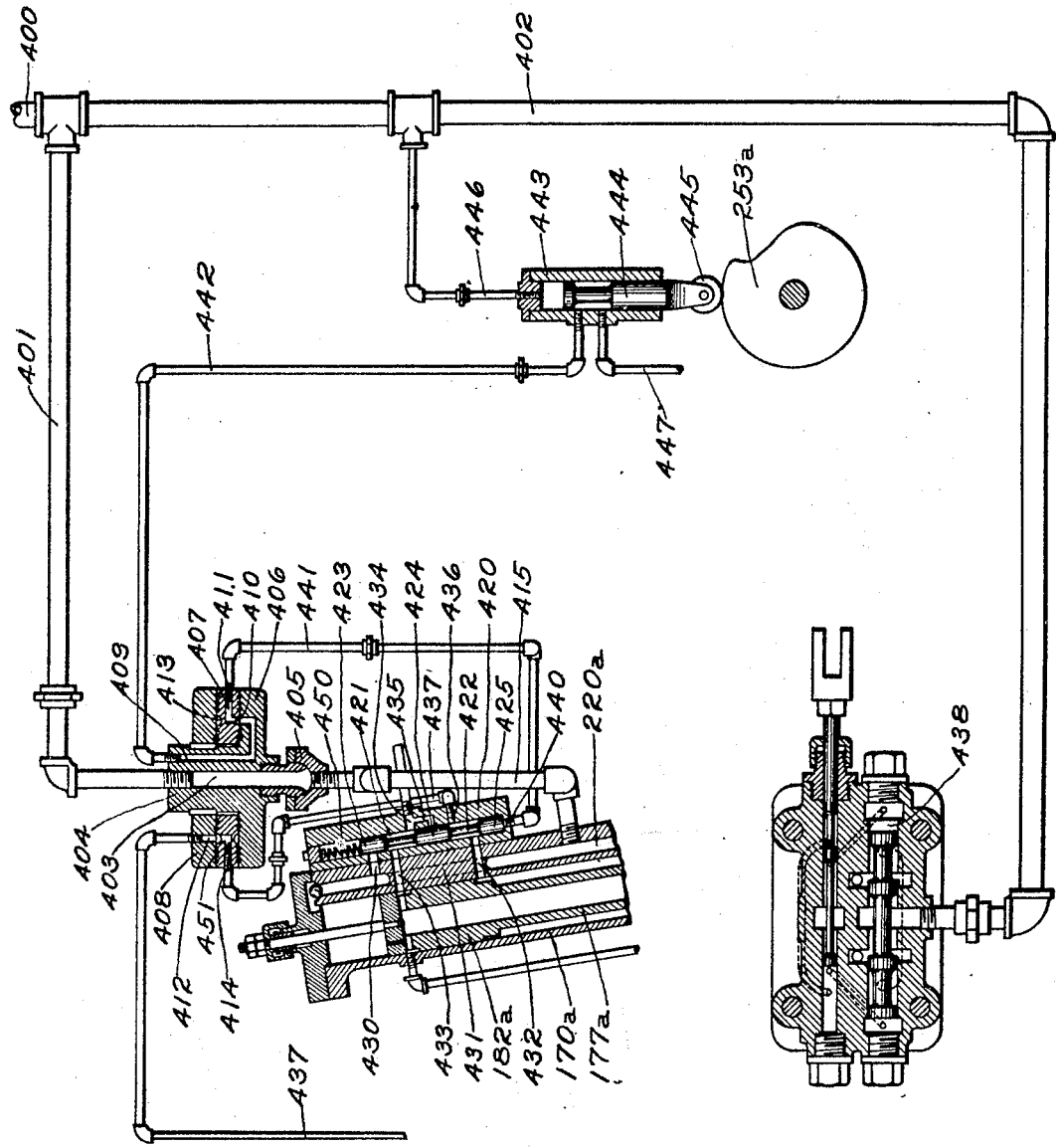

Patented July 1, 1930

1,769,192

UNITED STATES PATENT OFFICE

HARRY F. SMITH, OF MORAINE, OHIO, ASSIGNOR, BY MESNE ASSIGNMENTS, TO THE GAS RESEARCH COMPANY, OF DAYTON, OHIO, A CORPORATION OF OHIO

GAS PRODUCER

Application filed July 24, 1920. Serial No. 398,750.

This invention relates to gas producers, and more particularly to an improved method of gas generation, and to a producer, adapted to effectively carry out that method, in which the various functions of the producer, such as the feeding of the fuel, the agitation of the fuel bed, and other normal operation, are carried on by mechanical means.

One of the principal objects of the invention is to provide an improved method of gas generation in which gas of better than normal characteristics is obtained in greater quantities, for a given size producer, with an improvement in operating conditions.

Another of the objects of the invention is to provide a producer for carrying out this improved method of gas generation in which mechanical means are provided for carrying on the various activities of the producer, thus reducing to a minimum the amount of manual labor necessary during operations.

Other objects and advantages will be apparent from the description set out below when taken in connection with the accompanying drawing.

In the drawing, in which like characters of reference designate like parts throughout the various views thereof:—

Fig. 2 is a plan view of the producer shown in Fig. 1, with certain parts broken away to more clearly illustrate the invention;

Fig. 4 is a plan view of the driving mechanism, with certain parts thereof shown in section;

Fig. 5 is a vertical sectional view through the operating mechanism along the line 5—5 of Fig. 4;

Fig. 6 is a fragmentary view, in the nature of a perspective, of cam mechanism associated with the driving mechanism;

Fig. 7 is a fragmentary view, in vertical section, of one of the valves of the driving mechanism;

Fig. 8 is a longitudinal sectional view of another valve forming a part of the driving mechanism;

Fig. 9 is a detail view, in the nature of a fragmentary elevation of the ratchet and pawl mechanism through which turning movement is given to the top of the producer;

Figure 12:
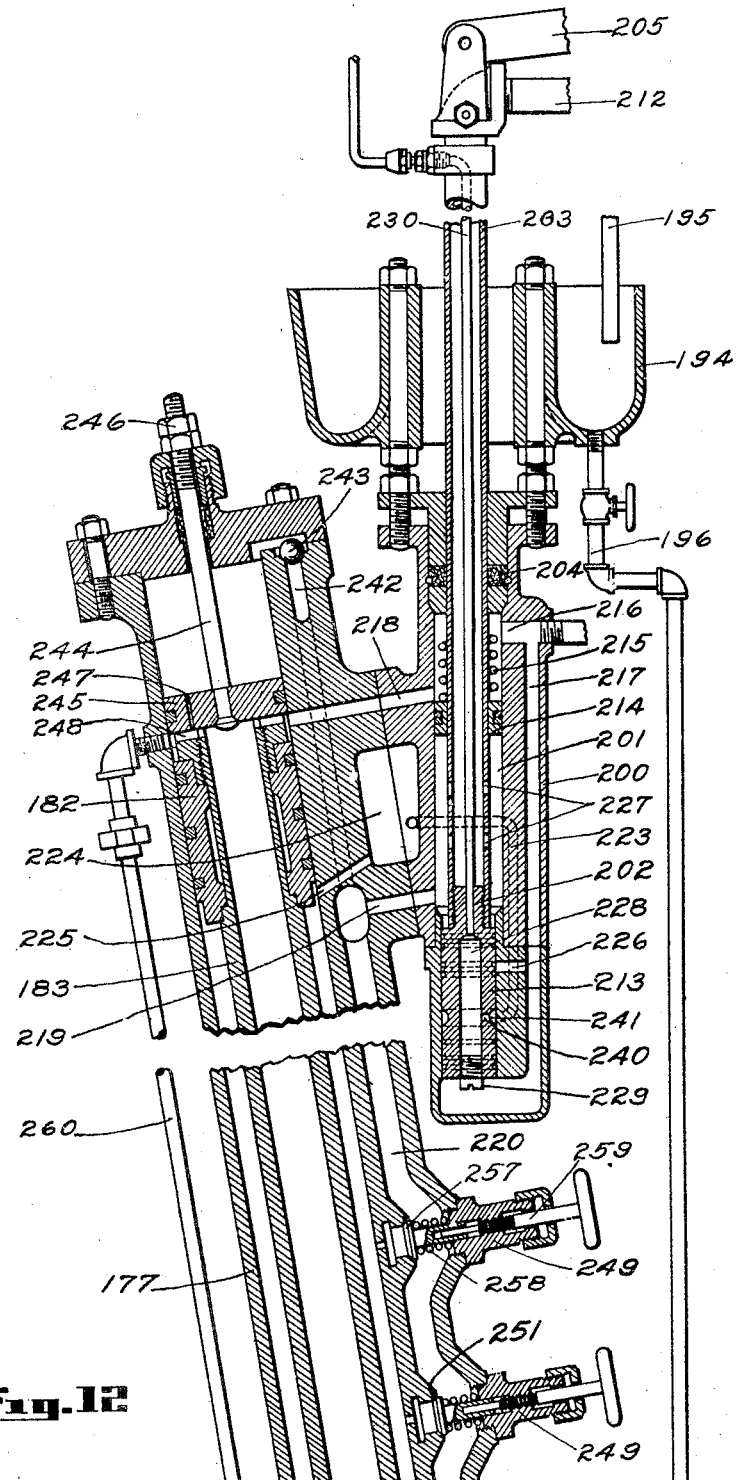

Figs. 12 and 12ª show, in vertical section, the poking mechanism;

Fig. 13, shows in vertical section, the valve controlling operation of the poker arranged in uppermost position;

Fig. 14 shows, in elevation, a slightly modified form of apparatus in which the top and operating mechanism of the producer is supported in a somewhat different manner;

Fig. 15 shows, somewhat diagrammatically, a different form of mechanism for actuating the various valves controlling the operating mechanism.

In the apparatus shown in the drawing 20 designates generally the generating chamber of a gas producer. This generating chamber consists of a metallic shell 21 having a lining 22, of fire-brick or some analogous material, and a grate 23 comprising a plurality of pivoted grate bars adapted to support a fuel bed. A pressure operating shaking mechanism 24 is associated with the grate for facilitating the removal of ashes from the lower zone of the fuel bed.

Figure 1:
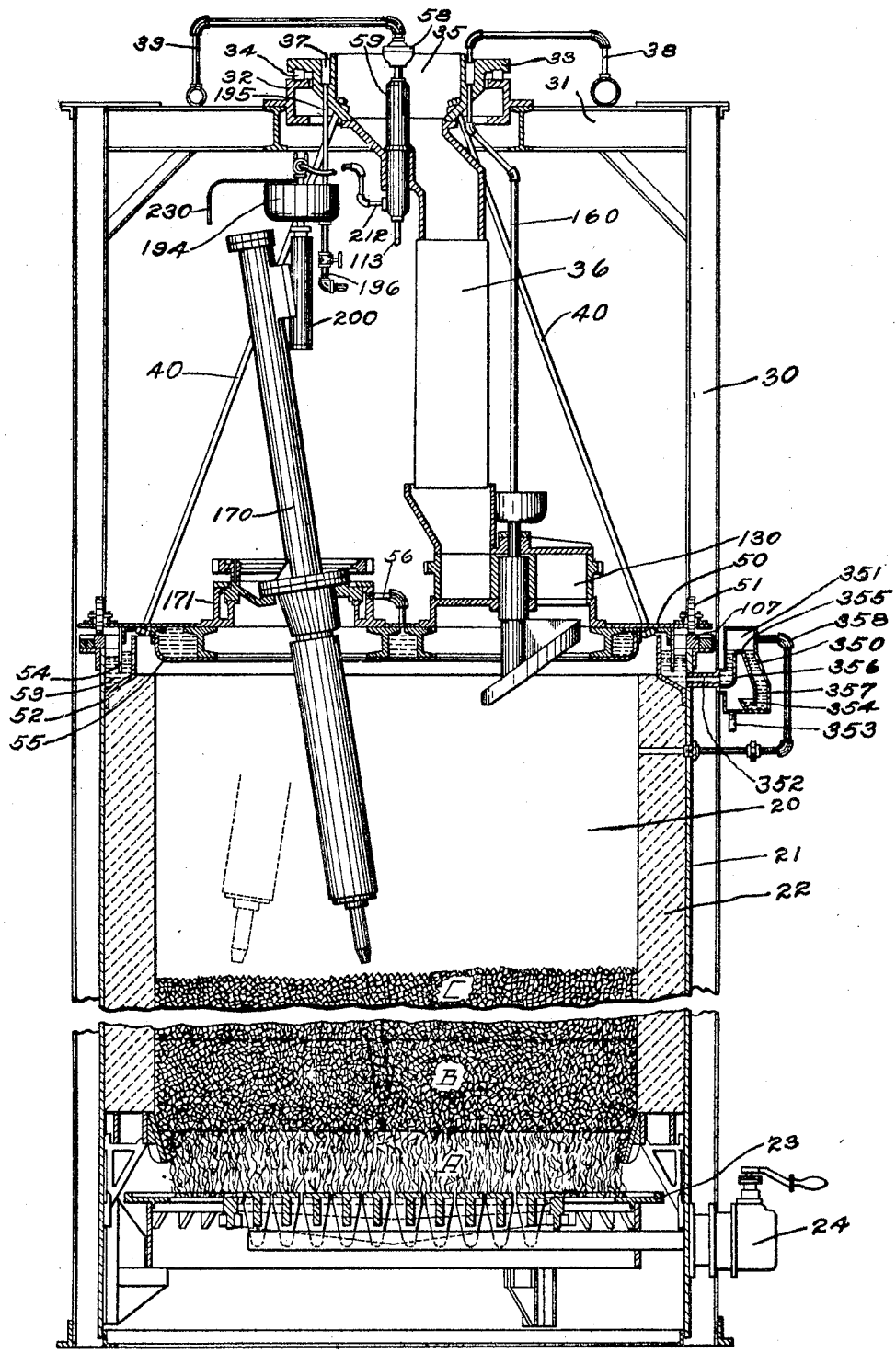
Fig. 1 is a vertical sectional view through a producer constructed in accordance with this invention.
Figure 3:
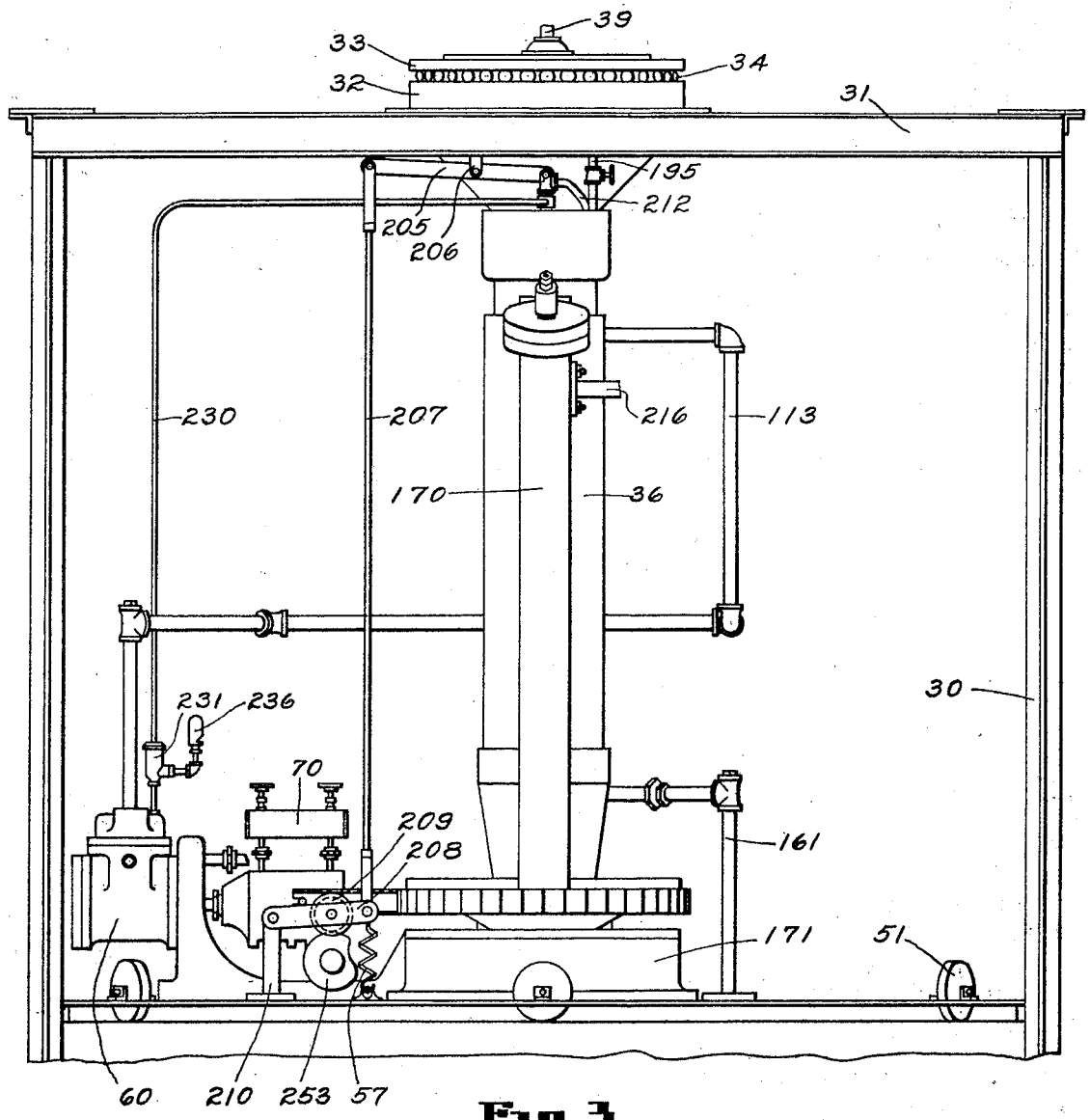
Fig. 3 is a detail view, in elevation of the mechanism carried by the top of the producer.

Extending upwardly from the foundation supporting the generating chamber is a frame-work 30, of metallic members or beams, which is adapted to support the top of the producer, along with the various parts of mechanism carried by such top. As shown in Figs. 1 and 2 of the drawing this frame-work 30 has at the top thereof certain members, or cross-beams, 31 adapted to support a hollow flanged member 32 which carries the lower race of a roller bearing. The member 33 carries the other race of the bearing, and the two members 32 and 33 are held in spaced relation by means of the rollers 34 which cooperate with the races carried by the two members, these parts constituting a roller bearing which sustains the entire weight of the top and mechanism carried thereby. The member 33 has a somewhat funnel shaped opening or passage 35 therethrough which is connected at its upper end to the hoppers, not shown, in which fuel is stored, and at its lower end to a conveyor member 36, the lower end of which opens into the fuel feeding mechanism. Surrounding the passage 35 is a trough 37 adapted to receive cooling fluid from a pipe 38.

Attached to the member 33 and extending downwardly therefrom are a plurality of supporting rods 40, each of which is rigidly attached at its lower end to the top 50 of the producer. By means of these rods the producer top, with the mechanism carried thereby, is supported from the roller bearing. The diameter of the roller bearing is relatively small, when compared with the diameter of the producer and of the top thereof, the bearing, in actual practice, being made as small as may be and still permit of its safely sustaining the weights carried by it. By means of this method of suspension the difficulties attendant upon maintaining the top in proper horizontal adjustment is taken care of very satisfactorily. In addition the use of a bearing of small diameter permits of rotating the top with a comparatively small expenditure of power, the less the diameter of the bearing the less the amount of power required. In order to assist in maintaining horizontal balance of the top a plurality of rollers or sway bearings 51 are attached thereto, which coact with a track 107, carried by the body portion of the producer, to sustain any unbalanced weights placed on the top.

Inasmuch as the top of the producer, in the modification shown, is adapted to rotate, the pipes which lead to the top must be so arranged as to permit of such rotation. This is accomplished with regard to the pipe 38 supplying cooling fluid by not connecting that pipe to the top mechanism, but by positioning the open end of this pipe so that it will empty into the trough 37 of the roller bearing. Obviously such arrangement is not expedient with the pipe supplying the pressure, or operating, fluid. This pipe, 39, is connected through a swivel joint 58 to a manifold or receiver 59. This receiver is rigidly attached to the top mechanism, and is so mounted that the longitudinal axis thereof, and of the swivel joint, lies in the axis of rotation of the top 50. The swivel joint 58 may be of any desired construction, but as steam is used as the operating fluid, it should be of such character as to remain tight during continued operation. Leading off from the reservoir or manifold 59 are two pipes, one of which 212 supplies steam to the valve 202, of the poker mechanism, and the other, 113, to the cylinder 60 of the driving mechanism.

Associated with the upper edge of the shell 21 is a member 52 spaced therefrom to form a trough 53 around the upper end of the generating chamber, which trough, is adapted to contain a liquid, such as water. Attached to the top 50 is a depending flange 54 which extends into the trough 53, the lower edge of this flange being, during operating of the producer, immersed in the liquid within the trough. Water is supplied to this trough during operation as needed from the space within the top, by means of a conventional trap 360, shown diagrammatically in Fig. 2. Other means of disposing of the cooling water in the top and of supplying water to the trough 52 may be used if desired. The trough, liquid, and depending flange, thus constitute a water seal, adapted to prevent leakage either into or out of the generating chamber. This invention is applicable to either pressure or suction operated producers, but the producer herein disclosed is designed for suction operation. This means that, during operation, the interior of the generator 20 is under partial vacuum. When the producer is in operation there is, therefore, a tendency for the water within the seal to stand at a higher level upon the inner side of the flange 54, which is connected to the interior of the generator, than upon the outer side thereof, which is connected to the atmosphere. And with sufficient vacuum within the producer the seal may be broken. To overcome this difficulty the trap, designated generally by the numeral 350, is provided. This trap comprises a closed vessel 351, the interior of the vessel being in communication, through the passage 352, with the trough 53. Leading out of the bottom of the vessel is an outlet pipe 353, a weir 354 extending upwardly from the bottom of the vessel and surrounding the opening into said pipe. Within the vessel and interposed between the opening of the passage 352 and the outlet opening into the pipe 353 is a partition 355 having an upstanding flange 356 and a depending flange 357, the lower edge of which terminates at a lower level than the upper edge of the weir. Also opening into the vessel, above the top of the flange 356, is a pipe 358 the opposite end of which opens into the interior of the generator 20. In this trap the upper edge of the partition 355 is lower than the upper edge of the member 52. And as the interior of the vessel 350 is under the same pressure, or vacuum, as the space inside the flange 54 any tendency for the water to rise inside this flange will be accompanied by a corresponding tendency for the water to rise within the trap. But the upper edge of the partition 355 is lower than the upper edge of the member 52, and thus determines the effective height of the water within the space to the inner side of the member 52. But, since the inside of the vessel 350 is under vacuum, means must be provided to insure the escape therefrom of any water which passes over the partition 356, as otherwise the device would be rendered inoperative. Any water passing over the flange 356 tends to accumulate within the bottom of the vessel, being trapped by the weir 354. And as the flange 357 terminates at a level which is below the upper edge of the weir an effective seal is thus maintained within the trap. To insure the escape of water from the trap, despite the vacuum therein, the top of the weir is located a sufficient distance below the upper edge of the partition 356 to give a big enough head to overcome this vacuum. During operation water is continuously supplied to the trough 52, and this means a continuous flow through the trap. This water, which is heated quite warm while within the trough, is usually passed to a saturator, not shown, where it is passed in contact with air to more or less completely saturate that air with moisture, this moisture containing air being subsequently passed into the fuel bed of the producer. Also attached to the top is a member 55, which is spaced therefrom, the top being thus double-walled, the space between the two walls of the top being adapted to receive a liquid, such as water, which is circulated therethrough during operation of the producer, to prevent the top from becoming unduly heated.

Within the top 50 are two openings, each of which is eccentrically arranged with respect thereto, one of these openings being adapted to receive a fuel feeding mechanism designated generally by the numeral 130, and the other to receive a poking mechanism designated generally by the numeral 170. Mounted upon the top and arranged substantially midway between the fuel feeding mechanism and the poker mechanism is a driving mechanism, designated generally by the numeral 60. The relative arrangement of the driving or operating mechanism, the fuel feeding mechanism and the poker mechanism is clearly shown in Fig. 2. The operating mechanism, as shown more in detail in Figs. 4 through 9 consists of a prime-mover, arranged in driving connection with the fuel feeding mechanism, the poker mechanism, and the mechanism for causing relative rotation of the top and body portion of the producer.

In the modification of the invention illustrated in the drawing the prime-mover consists of a steam engine. Of course, other types of prime-movers may be used if desired, it being obvious that slight modifications in structural details will be necessary if another type of prime-mover is substituted for the form shown. This steam engine consists of a cylinder 61 having a double action piston 62 therein carried upon a piston rod 63, a proper packing 64 being provided within the end of the cylinder for preventing leakage around the piston rod where it passes therethrough. Attached to the free end of the piston rod 63, by any suitable means, is a balance cylinder 65 having a stationary piston 66 therein carried upon a rod 67, which is rigidly held in an upward extension of the frame-work 68. This frame-work 68 is adapted to support the engine, and some of its associated mechanism, it being rigidly attached to the top of the producer, as by means of suitable bolts 69. The cylinder 65 has attached thereto a chamber or reservoir 70, the interior of said reservoir being connected to the cylinder by means of passages 71 and 72 opening into opposite ends of said cylinder, the passages being so arranged that the piston 66 is always between the ends of the passages which open into the cylinder, regardless of the position of the cylinder. Each of the passages 71 and 72, is at its upper end, where it opens into the reservoir 70, shaped to form a valve seat 73, as clearly shown in Fig. 7. Extending downwardly through the top of the reservoir 70 are two valve carrying members 74 and 75. Each of these members comprises a lower portion 76, the free end of which is shaped to cooperate with the valve seat 73, this free end thus constituting a valve 77. Each of the valve carrying members 74 and 75 is threaded through the top of the reservoir so that the position of either valve 77 relative to the valve seat 73 can be properly regulated to give any desired effective opening through said seat. Each of the lower portions 76 has a longitudinal passage 78 therethrough from which radiates a plurality of passages 79. The lower end of each passage 78 constitutes a valve seat 80, with which cooperates a valve 81. This valve is normally held pressed against the seat 80 by means of a spring 82 the upper end of which is attached to a cross member or pin 83, and the lower end to a guide 84, carried by the valve 81. Each of the members 76 is detachably connected to the upper portions of the members 74 and 75, thus permitting ready access to the spring 82 and pin 83, so that proper regulation of the tension of the springs 82 may be secured. The cylinder 65 is adapted to contain a liquid such as oil, and the reservoir 70 is adapted to also contain some of the same liquid. As the piston 62 is moved in one direction or the other the cylinder 65 is moved correspondingly. The piston 66, however, remains stationary and oil therefore flows from one end of the cylinder 65 into the reservoir and from the reservoir into the other end of the cylinder 65. By properly regulating the rate at which the oil within the cylinder 65 may pass from the cylinder into the reservoir 70 a definite and constant speed of movement of the piston may be secured. As the cylinder moves to the right the oil within the cylinder is forced through the passage 72, and as the valve 81 will be held upon its seat by the combined action of the spring 82 and the pressure of the oil, the only escape for this oil is through the space between the valve 77 and the valve seat 73. By properly regulating the effective opening through the valve seat 73 the rate at which the oil passes therethrough may be very nicely regulated. As the cylinder 65 moves to the right the space, within the cylinder, to the right of the piston 66 will increase as the space to the left of the piston decreases. Obviously oil must move from the reservoir 70 into the cylinder 65 to the right of the piston, to fill that space. There is no necessity for a nice regulation of the flow of oil into the cylinder 65, it being merely desirable that the flow be sufficiently rapid to prevent the formation of a vacuum therein. Obviously if the opening through which the oil flows into the cylinder 65 is greater than the opening through which it escapes from the cylinder 65 there will be no actual building up of such vacuum. Each of the members 76, is thus provided with a valve 81 which is adapted to open under suction to permit an added flow of oil from the reservoir 70 through either of the passages 71, 72, to the cylinder 65. The spring 82 need only be under sufficient tension to normally maintain the valve 81 upon its seat. The arrangement of the cylinder 65 and reservoir 70, should be such that the reservoir itself will contain a very substantial quantity of oil in addition to the oil normally contained within the cylinder 65. In this way a free flow of oil into the cylinder is permitted to prevent the building up of excessive unbalanced pressures.

Rotatably mounted on the top of the producer, in suitable journals is the shaft 90. This shaft is arranged substantially perpendicular to the longitudinal axis of the cylinder 65. Upon its free end is a pin 91, offset with respect to the longitudinal axis of the shaft 90. Pivotally mounted upon the pin 91 is a pawl 92, the free end of which is adapted to cooperate with a rack, or series of teeth 93, carried by the shell 21, of the producer, at the upper end thereof. In the construction shown the generating chamber of the producer, and the teeth 93 carried thereby remain stationary and the top is movable relative thereto. This is more desirable than maintaining the top stationary and causing the body portion of the producer to rotate, but if desired this latter arrangement may be used. But the top and body portion of the producer should be rotatable relative to each other. Mounted upon the shaft 90 is a gear or pinion 94, this gear being keyed or otherwise attached to the shaft so that it will rotate therewith. Carried upon the lower part of the cylinder 65 is a rack 95, the pinion 94 being so positioned along the shaft 90 that the teeth of said pinion and of said rack mesh. As the cylinder 65 moves back and forth the pinion 94 will be oscillated to oscillate the shaft 90. The pawl 92 being eccentrically pivoted to the shaft 90 will thus be actuated to cause a progressive rotation of the top 50.

Mounted upon opposite sides of the cylinder 65 are two members 100 and 101, each of these members being pivotally supported intermediate its ends by means of a pivot pin 102. Each of these members has a spring 103 associated with one end thereof which springs tend to swing said members about their pivots to force their other, or free ends, apart. The free end of each of the members 100 and 101 is bifurcated as shown most clearly in Fig. 5, a rod 105 being mounted in the bifurcations. Each of these members thus constitutes a pawl, the rod 105 being adapted to cooperate with teeth, upon certain parts of the apparatus, described below. Locking members 106 are provided so that either or both of the pawls 100—101 may be held out of operative position. These locking members consist of latches adapted to be dropped into place to hold the members 100—101 against the action of the springs 103.

Opening into opposite ends of the cylinder 61 are two passages 110 through which pressure steam is admitted into the cylinder and upon opposite sides of the piston 62 to cause actuation of that piston. These passages communicate with a passage 111 within the steam chest 112, the passage 111 having communication with the steam supply pipe 113 by means of the passage 114. The passages 110 are also connected, through the passage 111, to exhaust passages 115 which open into the main exhaust 116. Slidably mounted within the passage 111 is a piston valve 117 which has enlargements 118 thereon, the positioning of the various passages opening into the passage 111, and of the enlargements 118, being such that when one end of the cylinder 61 is connected to the pressure steam within the passage 114 the other end of the cylinder will be connected to exhaust. Also located within the steam chest 112 is a passage 120 which is in open connection with the passage 114. This passage 120 is also connected by means of passages 121 to the opposite ends of the passage 111, the arrangement being such that the valve 117 is always positioned intermediate the ends of the passages 121, where they open into the passage 111. Also connected to the passage 120 are two passages 122 which open into the main exhaust passage 116. Slidably mounted within the passage 120 is a pilot valve 123 having enlargements 124 thereon. This valve has the stem 125 thereof operatively connected to a link 126, pivotally mounted upon the extension 127 of the frame 68. Operatively connected to the link 126 is an arm 128 which extends through the bearing 119 carried by the cylinder 65. Adjustably mounted upon the rod 128 are two stop nuts 129, which are spaced apart a distance less than the stroke of the piston 62, and so less than the distance of travel of the cylinder 65. As the cylinder 65 moves back and forth, then, the bearing 119 comes in contact, when it is near the end of its travel in one direction with one of the stop nuts, and, when it is near the end of its travel in the other direction, in contact with the other stop nut. The rod 128 is thus positively moved longitudinally, with a resultant swinging of the link 126 about its pivot to cause reciprocation of the valve 123 within the passage 120. And the passages opening into the passage 120, and the enlargements 124 carried by the valve 123, are so positioned relative to each other that when the valve 123 is moved in either direction it will connect the passage 111 at one end to one of the passages 121 and so to pressure steam, and will connect the passage 111 at the other end to one of the passages 122 and through this passage to the exhaust. As one end of the passage 111 is connected to pressure steam and the other end to the exhaust the valve 117 will move, under the action of the pressure steam, within the passage 111, to thus interchange the ends of the cylinder 61 which are connected respectively to pressure steam and to the exhaust.

Figure 10:
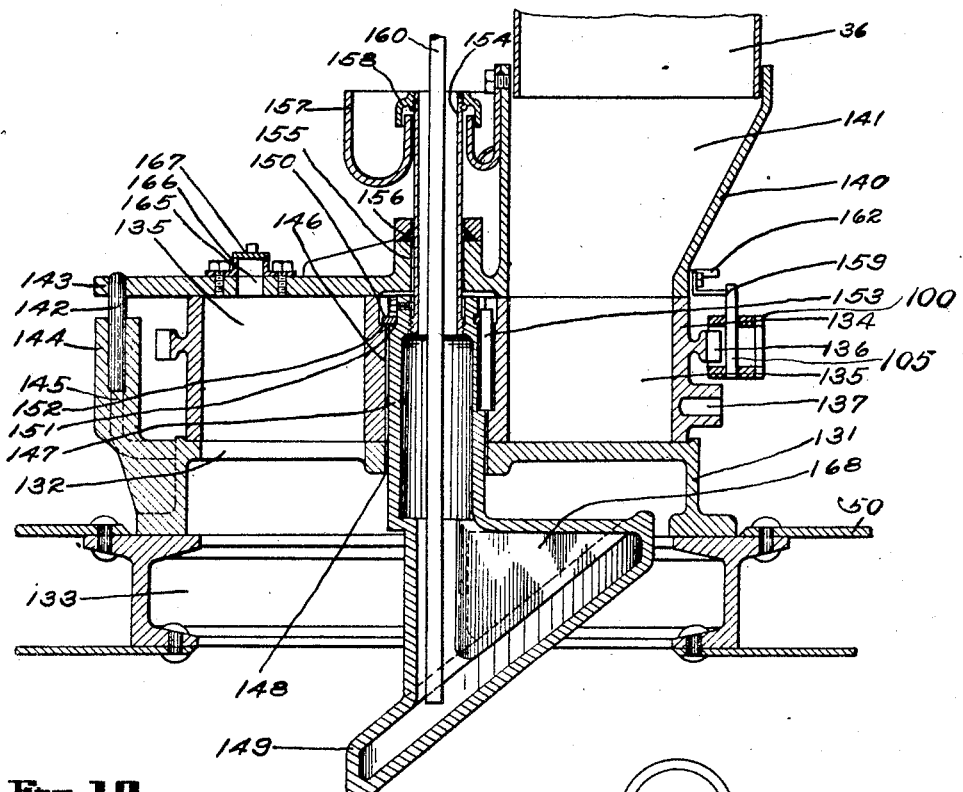
Fig. 10 is a vertical sectional view through the fuel feeding mechanism along the line 10—10 of Fig. 11.
Figure 11:
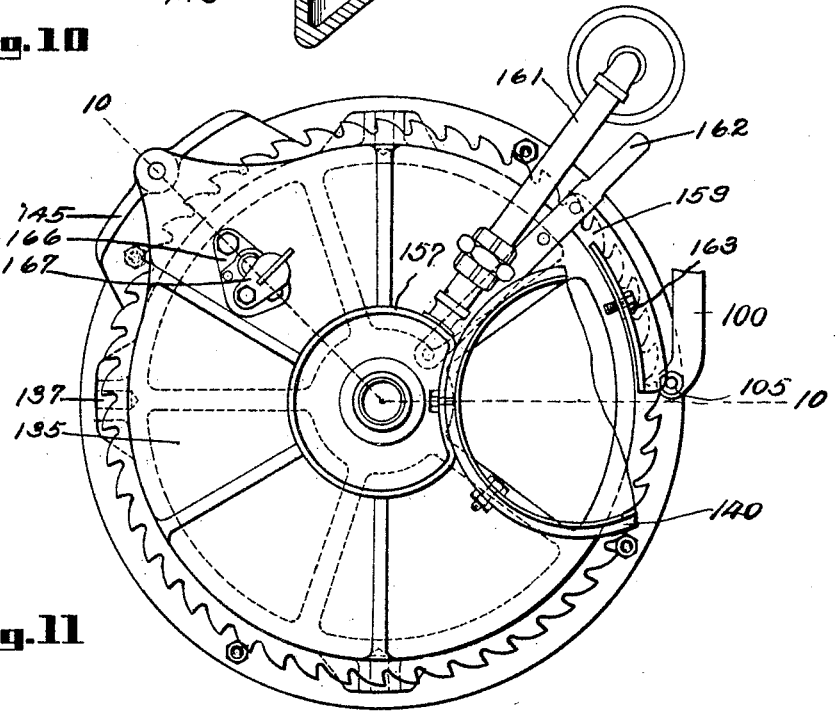
Fig. 11 is a plan view of this mechanism.

In Figures 10 and 11 is shown in detail the fuel feeding mechanism, designated generally by the numeral 130. This fuel feeding mechanism consists of a base member 131 which is rigidly attached to the top of the producer by any desired or conventional means. The member 131 has a sector shaped opening 132 therethrough which communicates with the interior of the producer through the opening 133 within the top of the producer. Mounted upon the base member 131 is a rotatable member 134 having a plurality of pockets 135 therein, each of these pockets being of substantially the same size and shape as the opening 132. Carried by the rotatable member 134, and upon the outside thereof, is a toothed rack 136, the teeth of which are adapted to cooperate with one of the rods 105 in the outer end of the pivoted members 100—101 carried upon the cylinder 65. Also carried upon the outside of the rotatable member 134 are several sockets 137, which are adapted to receive a proper tool for manual rotation of the member 134. Mounted above the rotatable member 134 is a top or hopper member 140 having a fuel supply passage 141 therethrough, the upper end of which is adapted to receive the lower end of the conveyor member 36, and the lower end of which is adapted to register with the pockets 135 as the member 134 is rotated. The hopper member 140 is held in stationary position with relation to the base member 131, by means of a pin 142, which passes through an extension 143, carried by the hopper member, and seats in a socket within the upwardly extending member 144 carried by the base member 131. As shown the member 144 has bracing webs 145 attached thereto to strengthen it, but these webs of course may be omitted if desired. The contacting faces of the members 131, 134 and 140 are properly machined to fit with a substantially gas-tight joint, and the base member 131 and hopper member 140 are so positioned relative to each other that the opening 132 and passage 141 are at no time, during operation of the device, brought into direct communication with each other. As the member 134 is rotated, during operation, each of the pockets 135 therein is brought first into register with the lower end of the passage 141 to receive a charge of fuel, and is then brought into register with the opening 132 to discharge the fuel within such pocket into the generating chamber of the producer. By means of this arrangement objectionable leakage of atmospheric air into the generating chamber of the producer, or the leakage of gas from the generating chamber into the atmosphere is prevented. Mounted in the passage 146, in the rotatable member 134, is a hollow shaft 147, which extends through the opening 148, in the base member 131, and has a hollow distributing member 149 carried upon the lower end thereof, and arranged at an angle to the vertical axis of the shaft. This shaft and distributing member are supported from the member 134 by means of a bearing ring 150 which is held in place in a groove 151 within the upper end of the shaft 147, the ring coacting with the shoulder 152 within the passage 146. The shaft 147 is keyed to the member 134 by means of the key 153, so that upon rotation of the member 134 the shaft and the distributor 149 carried thereby will be rotated therewith. Removably attached to the upper end of the hollow shaft 147 is a pipe 154 which passes upwardly through the opening 155 in the hopper member 140, leakage through the opening, and around the pipe 154, being prevented by means of suitable packing 156. Carried by the hopper member 140 and surrounding the pipe 154 is a cylindrical trough shaped member 157, the upper end of the pipe having an overhanging flange 158, which encloses the inner upturned portion of this member. Passing downwardly through the pipe 154, the hollow shaft 147, and terminating within the hollow distributing member 149, is a pipe 160 the upper end of which opens into the trough 37, and through which cooling fluid passes from such trough into the distributing member, the cooling fluid from the distributor passing upwardly through the hollow shaft 147 and pipe 154 whence it overflows into the cup shaped member 157, the overhanging flange 158 preventing the leakage of such water between the inner upturned portion and the pipe 154. Leading off from the cup-shaped member 157 is a pipe 161 through which the cooling water escapes and passes into the hollow top of the producer. In order to insure a proper circulation of cooling fluid in that part of the hollow distributor which is above the lower open end of the hollow shaft 147, the highest point of the space within the distributor is connected to the interior of the shaft. As shown the distributor has a hollow upward extension 168, the space within which is connected to both the interior of the shaft and the interior of the distributing member. Usually the distributor, shaft 147 and hollow extension 168 are cast integral to give substantially the arrangement shown in Fig. 10.

In the arrangement shown in the drawing, the pivoted member 100, carried by the cylinder 65, is adapted for cooperation with the fuel feeding mechanism, and upon reciprocation of the cylinder 65 in the proper direction the rod or pawl 105, carried by this pivoted member, will coact with the teeth of the rack 136 to cause a continuously progressive rotation of the member 134. As shown, the pawl 100 causes rotation of the member 134 upon backward movement of the cylinder 65, to rotate the member 134 in the direction of the corresponding arrow in Fig. 2. As the pockets 135 are brought into register with the passage 141, fuel is received by each of these pockets, such fuel being subsequently discharged through the opening 132. If desired the opening 141 may be made smaller than the pockets 135. This prevents feeding sufficient fuel to these pockets to cause jamming of the apparatus. The distributing member 149 being keyed to the rotatable member 134 rotates therewith, and consequently the position of this member relative to the opening 132 is progressively varied. As shown in the drawing the distributing member is so mounted with relation to the discharge port 132 that when in one extreme position it lies under substantially no part of the port, while in another extreme position it lies under substantially the entire port. That is, when in one extreme position the fuel falling through the port 132 falls, substantially, not at all upon the distributor, while in another position substantially all of the fuel falls thereupon. And by proper positioning intermediate these two extremes the amount of fuel which does and does not fall upon the distributor may be varied at will. The upper surface of the distributor is flat or plane and inclined to the horizontal so that fuel falling thereupon will slide across this upper surface and be deposited upon the fuel bed within the generator. And the distributor along its lower edge is cut away, as shown in Fig. 10, so that more of the distributor is to one side of the shaft 147 than to the other. Thus as the distributor is rotated more and more of the upper part of the distributor is brought beneath the port 132, and, this opening being arranged over the outer part of the fuel bed, a progressively increasing quantity of fuel therefore falls thereon to be distributed to parts of the fuel bed other than the outer part. By means of this type of fuel feeding mechanism a substantially uniform distribution of the fuel is obtained, it being obvious that, in order to secure a uniform distribution of the fuel over the fuel bed, greater quantities of fuel must be distributed adjacent the wall of the producer than over the central part of the fuel bed.

With this type of fuel feed the quantity of fuel fed to the producer depends upon the rate at which the member 134 is rotated. To properly control this rate of rotation means is provided whereby the pawl 100 during its working stroke will advance the member 134 one tooth or a plurality of teeth as desired. To effect this control a plate member 159 carried by a pivoted lever 162 is positioned to overlie the teeth of the rack 136. This plate 159 is of sufficient width to hold the rod 105 of the pawl 100 out of the engagement with the teeth of the rack 136. By swinging the lever 162 about its pivot the plate 159 may be so positioned that the pawl 100 will coact with one, two or three teeth, as desired. A set screw 163 is provided for holding the plate in adjusted position.

Provided in the hopper member 140 is a poke hole 165, through which a poker or bar may be inserted when deemed necessary. This hole 165 has a cover therefor, which consists of a base plate 166 rigidly attached to the hopper member 140 and a pivoted plate 167 which may be swung upon its pivot to either cover or uncover the hole 165.

In Figs. 12 and 12ª is shown in detail the poking or barring mechanism, illustrated broadly in Fig. 1 and designated generally by the numeral 170. This poking or barring mechanism is mounted upon a base member 171 which is rigidly secured to the top of the producer, and which carries a rotatable turret member 172, this turret member being held in position by means of a plate 173 which is secured to the base by means of bolts of any desired type, the arrangement being such that the turret is held in proper position while free rotation of the turret upon the member 171 is provided. As shown in Fig. 12ª the turret 172 is seated upon an upstanding flange 174, the coacting faces of the turret 172 and flange 174 being in sliding contact with each other, a grease cup 175 being provided for supplying a proper amount of lubricant to the contacting surfaces. Carried by the turret 172 is a toothed rack 176, the teeth of which are adapted to coact with the pivoted member of pawl 101, carried by the cylinder 65 of the operating mechanism. Also carried by the turret 172 is the poker mechanism proper.

The poker mechanism proper comprises a cylinder 177 provided, near its lower end, with a flange 178. Mounted upon the lower end of the cylinder is the flange 179 of the housing member 180, the two flanges 178 and 179 being rigidly held together and, the cylinder and housing member being rigidly secured to the turret, as by means of the bolts 181 which pass through both these flanges so that said poking mechanism proper is carried by the turret as it rotates.

Mounted within the cylinder 177 is a hollow piston 182, to which is attached a hollow piston rod 183, the piston and piston rod constituting the poker of this mechanism, the proportions of the piston or poker, and the location of the poking mechanism, being such that upon reciprocation of the piston in one direction the poker is driven into the fuel bed, any desired distance, and upon reciprocation in the other direction the poker is entirely withdrawn from the fuel bed. Suitable packing is arranged within the lower end of the cylinder 177, and surrounding the poker 183, which acts as a bearing for the poker and also for properly closing the lower end of the cylinder, to prevent leakage of operating steam through the housing into the generating chamber of the producer. This packing consists of a metallic ring 184 which seats against a shoulder 185 in the lower end of the cylinder, a spring ring 186 serving to hold the metallic ring 184 in position. A packing 187, of any suitable character, such as asbestos wick, is placed next to the ring 184, a follower ring 188 being placed against the packing, and a gland 189 threadedly mounted in contact with the follower ring 188, the construction being such that any desired pressure of the packing 187 may be secured by proper manipulation of the gland. Keyed to the gland 189, in such wise as to permit of longitudinal movement relative to each other but to insure rotation of the two together, is a gear 190 adapted to mesh with a pinion 191 carried upon the rotatable shaft 192, the inner end of which is journaled within the housing member and the outer end within the flange 178, the free end of this shaft being shaped to receive a wrench or other operating tool. Rotation of this shaft will cause a corresponding rotation of the gear 190, with a consequent increase or decrease in the compression of the packing 187. Attached to the lower end of the housing 180 and within the generating chamber, is a double walled cooling chamber 193, into which any desired cooling fluid is introduced, for keeping the temperature of the poker and associated parts sufficiently low during operation. Carried upon the upper part of the poker mechanism is a trough shaped member 194 to which cooling water is supplied through the pipe 195, which opens into the trough 37. Leading from the trough member 194 is a pipe 196, which connects to a passage 197 within the turret and housing, which passage in turn connects to the lower end of the cooling chamber 193, to supply that chamber with a cooling fluid, such as water. Leading off from the upper end of the cooling chamber 193, is a passage 198, through the housing and turret which connects that chamber to the space 199 within the base member 171, which space is in turn connected, through the pipe 56, to the double walled cooling space within the top 50. By means of this construction an adequate supply of cooling water for the chamber 193 is easily maintained.

For admitting steam, or any other desired operating pressure fluid, into the cylinder 177 valve mechanism is provided. This mechanism consists of a casing 200 having a passage way 201 therethrough in which reciprocates a piston valve designated generally by the numeral 202. The stem 203 of the valve 202 extends through the upper end of the passage 201, leakage around such stem being prevented by means of suitable packing 204. The outer end of the stem 203 is pivotally attached to a rocker arm 205 which is pivotally mounted, intermediate its length, upon the extension 206 attached to any suitable stationary part of the apparatus. The other end of the rocker arm is pivotally connected to the push rod 207, the lower end of the push rod being pivotally connected to a link member 208 carrying a cam roller 209, the link member being in turn pivotally connected to a standard 210 mounted upon the top of the producer. The spring 57, connected at one end to the link member and at the other to the producer, urges the roller against the surface of the cam 253 to thus cause movement of the valve 202 when the depression in the cam passes beneath said roller.

Steam under pressure is admitted into the valve casing 200 through a flexible supply pipe 212, connected to the hollow stem 203 of the valve member 202. The valve member has an enlargement 213 at the lower end and a second enlargement 214 spaced a suitable distance from the enlargement 213. Surrounding the stem 203 and located intermediate the packing member 204 and the enlargement 214 is a spring 215 which serves as a cushioning member when the valve is forced into uppermost position. Within the casing 200, is an exhaust passage 216 opening into the passage 201 above the enlargement 214. Connected with the exhaust passage 216 is a branch exhaust passage 217, opening into the passage 201 below the enlargement 213. Leading from the passage 201, adjacent its upper end, is a passage 218 which opens into the cylinder 177, the end of the passage where it opens into the cylinder 177 being so positioned that it is at all times above the piston. Leading off from the passage 201 is a passage 219 which opens into a passage 220 extending substantially parallel with the cylinder 177, this passage, at its lower end opening into the lower end of the cylinder 177 through a port 221 which is controlled by means of the spring pressed check valve 222. The valve 222 is adapted to permit the flow of steam from the passage 220 into the cylinder, beneath the piston, but to prevent the return flow of steam from the cylinder into the passage 220. Also leading from the passage 201 is a passage 223 which opens into the space 224 which space is in turn connected, through the passage 225, to the cylinder 177, this passage being so located that it is connected to the cylinder beneath the piston when the piston is in uppermost position, and above the piston when the piston is in lowered position. Also leading out from the passage 201 is a passage 226 which connects with the passage 217. The enlargement 213 has a longitudinal passage 228 therein, the lower end of which passage is closed by means of a plug 229, the upper end being connected through the small flexible pipe 230, which extends upwardly through the hollow stem 203, to a pressure controlled valve designated generally by the numeral 231, which valve is located upon the steam chest of the engine, as shown in Fig. 5.

The valve 231 comprises a casing 232 having a valve seat 233 in one end thereof with which seat the valve member 234 is adapted to cooperate. Leading off from the casing above the valve seat is a port 235 to which is connected a small whistle 236. Leading off from the space beneath the valve member is a pipe 237 the lower end of which opens into one end of the passage 111, the arrangement being such that the pipe 237 opens into that part of the passage 111 into which the passageway 121 opens. As shown the pipe 237 opens into the right hand end of the passage 111. As so constructed, the valve member 234 is adapted to control the flow of pressure steam from within the passage 111 through the pipe 237 and port 235 to the whistle 236. Attached to the stem of the valve member 234 is a flexible diaphragm 238, the port 239 opening through the top of the valve casing 232 to communicate with the interior of this flexible diaphragm. And the pipe 230, which leads off from the upper end of the passage 228 in the enlargement 213 of the valve 202 is connected to this port 239 and so to the space inside the flexible diaphragm 238. Through the wall of the enlargement 213 is a passage 240 one end of which connects with the passage 228 and the other end connects with a groove 241 in the enlargement 213. The passage 226 and the end of the passage 223 which opens into the passage 201 are so arranged relative to each other that when the valve 202 is in lowermost position, the position shown in Fig. 12, the groove 241, and thus the passages 240 and 228, are connected to the passage 223, and when in uppermost position the groove 240 and passages 241 and 228 are connected to the passages 226 and 217. Within the wall of the valve 202, intermediate the enlargement 213 and 214 are several passages 227, which connect the hollow stem of the valve with the passage 201, the space within this passage, intermediate the said enlargement being thus at all times connected to pressure steam.

Mounted upon the end of the shaft 90, and adapted to rotate therewith is an enlargement 250 which has a spring-pressed pawl 251 pivotally attached thereto. Also carried by the shaft, 90, and rotatably mounted thereon is a collar 252, one end of which is shaped to form a cam 253, adapted to cooperate with the cam roller 209. The other end of the collar 252 has a shoulder 254 thereon adapted to cooperate with the spring-pressed pawl 251 and a locking pawl 255, which is pivotally mounted upon the support 256, carried by the top of the producer, and is held against the collar through the action of gravity. As the shaft, and the enlargement 250 carried thereby, rotate the spring-pressed pawl 251, contacting with the shoulder 254, will cause the collar 252 to be rotated with the shaft, as the cylinder 65 is reciprocated in one direction. As the cylinder 65 moves in the opposite direction reverse rotation will be imparted to the shaft 90 and enlargement 250. During this reverse rotation the spring-pressed pawl 251 will ride freely over the collar 252, but the locking pawl 255, will then contact with the shoulder to prevent return movement of the collar along with the shaft. The arrangement of these parts is such that the cam 253 will be advanced 180 degrees during each operative rotation of the shaft 90. It is of course to be borne in mind that the shaft 90 does not rotate continuously in the same direction, but that it is oscillated as the cylinder 65 reciprocates first in one direction and then in the other, an oscillatory movement of substantially 180 degrees being imparted to the shaft upon each reciprocation of the cylinder. The cam being advanced only during oscillations of the shaft in one direction, two complete oscillations of the shaft in one direction are necessary for advancing the cam a complete revolution. The cam, through its cooperation with the cam roller 209 causes actuation of the valve 202 to control reciprocation of the poker.

Leading upwardly from the passage 220, through the wall of the cylinder 177, is a passage 242 which opens into the extreme upper end of the cylinder. This passage is controlled by the ball check valve 243 which allows the free flow of steam from the passage 220 into the cylinder but prevents return flow from the cylinder. Slidably mounted within a passage in the head of the cylinder 177 is a stem 244, leakage along said stem being prevented by means of suitable packing material. Carried by the lower end of the stem is a piston 245. This member 245 constitutes the piston of a dash-pot, adapted to take up the shock attendant upon bringing the piston 182 to a stop during its upward, or return, stroke. The position of the piston 245 within the cylinder may be adjusted by means of the adjusting nuts 246, upon the stem 244. A bleed port 247 is provided in the piston 245. Grooves 248 are provided in the upper surface of the piston 182 so that pressure steam may be admitted between the pistons 182 and 245 in case they come to rest in contact with each other. The space within the cylinder 177, above the piston 245, is normally connected to pressure steam through the passages 242 and 220. During upward movement of the piston 182, however, the pressure in that space tends to build up and the valve 243 therefore seats to prevent escape of steam therefrom. This part of the cylinder 177, therefore, functions as a dash-pot to bring the piston 182 to rest without subjecting the cylinder and connected parts to severe shocks.

One of the most serious defects attendant upon mechanically operated producers as heretofore designed results from the poker or agitator being so arranged as to be dragged or moved bodily through the fuel bed. This type of design has made necessary the use of enormously heavy parts, in order that the tremendous strains set up may be properly borne. The type of apparatus herein disclosed is specifically designed so that there will be no movement of the top and body of the producer relative to each other during such time as the poker is within the fuel bed. That is to say, the top and body portion of the fuel bed are moved relative to each other only during such time as the poker is elevated so as to be completely free from the fuel bed. By the use of this type of construction much lighter apparatus may be used, considerably less power is required for driving the operating mechanism, the life of all of the operating mechanism is greatly prolonged, and, in addition the fuel bed is maintained in such condition that decidedly better operating conditions are secured.

Because of the construction of the apparatus, as described above, the rotatable member 134 of the fuel feeding mechanism is moved during reciprocation of the cylinder 65 in one direction, while the turret carrying the poking mechanism, and the top of the producer, are rotated during reciprocation in the other direction. In order to secure that desired condition of operation, in which rotation of the top and body portion relative to each other takes place only when the poker is in elevated position, and completely clear of the fuel bed, the valve mechanism controlling the reciprocation of the poker is so arranged, and so actuated, that this poker will be forced downwardly into the fuel bed only when the top and body portions are at complete rest relative to each other.

In the modification of the device thus far described, the valve 202 is actuated by means of the cam 253, the spring 57 tending to normally urge the valve toward uppermost position. However this valve may not be normally moved to uppermost position inasmuch as the cam roller 209 normally is held by the cam 253 so that the valve 202 is held, against the action of the spring, in lowermost position. In Fig 12 the valve 202 is shown in lowermost position. As the cylinder 65 reciprocates the cam 253 is rotated, and the valve 202 is maintained in lowermost position until such time as the depression in the cam 253 is brought beneath the cam roller 209. When this occurs the cam roller drops into the depression, under the influence of the spring, and the valve 202 is forced into its uppermost position, the position shown in Fig. 13. At this time the turret carrying the poking mechanism and the top of the producer are both stationary. As the valve 202 is moved into uppermost position pressure steam passes from the pipe 212, through the hollow stem 203 of the valve and ports 227 into the passage 201, and thence through the passage 218 into the cylinder 177 above the piston. When the valve is in this uppermost position the enlargement 214 is so positioned as to cut off communication between the passage 218 and the exhaust passage 216. At the same time the enlargement 213 is so positioned that the passage 228 is connected through the passage 240, groove 241 and passage 226 to the exhaust passage 217. With the valve so positioned the cylinder 177 below the piston is also connected to pressure steam through the passages 201, 219 and 220. The passage 201 between the enlargements 213, 214 and the passages 219 and 220 are at all times connected to pressure steam through the port 227, stem 203 and inlet pipe 212. Because of the grooves 248 at the top of the piston pressure steam is admitted between the upper end of the piston and the member 245. The effective area of the top of the piston 182 is greater than the effective area on the bottom thereof and, therefore, even though both the upper and the lower surfaces of this piston are exposed to pressure steam, it will be forced downwardly because of the unbalanced pressures on opposite sides thereof. As the piston moves downwardly certain of the valves 249 will be successively moved from their seats as the pressure of the steam within the cylinder beneath the piston tends to build up higher than the pressure of the steam within the passage 220.

The valves 249 consist, each, of a valve member 257 which is normally held against its seat 251 by means of a spring 258. This spring exerts sufficient pressure upon the valve to hold it normally in contact with its seat, so that the flow of steam therethrough from the passage 220 into the cylinder, will be prevented, but the flow of steam from within the cylinder into the passage 220 may occur upon slight preponderance of pressure within the cylinder over the pressure within the passage 220. Each of these valves is provided with an adjustable stem 259 by means of which the degree of opening of the valve members may be controlled. Each of these adjustable stems is so constructed that it may be moved inwardly a sufficient distance to contact with the cooperating valve member, to hold it firmly upon its seat. By the use of these valves any desired cushioning effect, beneath the piston 182, may be obtained. As shown in the drawing the two lower of the valves 249 are so arranged that each valve member thereof is held firmly against its cooperating seat, the uppermost of the valve members being so arranged that it may be moved from its seat to permit the flow of steam within the cylinder to the passage 220. As the piston moves downwardly, as the result of unbalanced pressures upon opposite faces thereof, the uppermost of the valves will be moved from its seat, each of the two lower valves however being held firmly against its seat. As the piston continues its downward movement and passes the uppermost valve, pressures within the cylinder beneath the piston will build up. The downward movement of the piston will continue, then, until such time as the pressures within the cylinder, and beneath the piston, have built up sufficiently to balance the pressures upon opposite faces of the piston. By means of this construction the downward travel of the piston may be varied as desired, it being evident that the piston would travel farther in its downward movement if two of the valves 249 were adapted to permit the escape of steam from within the cylinder into the passage 220, instead of one as illustrated. Not only does this construction permit of controlling the length of stroke of the poker, but, in addition, permits of absorbing the inertia of the piston and thus substantially eliminating jars and strains that might result from suddenly stopping the downward movement of the piston.

During the operation of the poker, thus far described, the valve 202 is held in uppermost position. As the rotation of the cam 253 continues, however, the depression therein will be moved out from under the cam roller 209 and the valve thus forced into lowermost position, the position shown in Fig. 12. It must be borne in mind that at the moment the valve is moved to this lowermost position the piston 182 is also in lowered position. As the valve is moved into the position shown in Fig. 12 the space above the piston 182 is immediately connected to the exhaust passage 216. The passages 219 and 220 are still connected to pressure steam and, since the pressure steam within the passage 220 has ready access to the cylinder beneath the piston 182, through the valve controlled port 221, the piston will immediately be forced upwardly. In order to eliminate the jar and strains that would be normally attendant upon bringing the piston to rest, the upper end of the cylinder 182 is provided with a dash-pot, as described above.

As stated above, one purpose of this invention is to provide apparatus in which the poker is at no time dragged bodily through the fuel bed. The operating mechanism thus far described will, when functioning normally, cause rotation of the top and body portion of the producer relative to each other only when the poker is completely out of the fuel bed. Or, to put it in another way, the poker will be reciprocated only when the top and body portion of the producer are stationary relative to each other. In actual practice, however, it sometimes happens that, because of some unusual condition, the mechanism thus far described will not function properly. For example, the valve 202 might be moved into proper position for causing upward reciprocation of the poker, and for some reason, the poker might fail to return to its upward position, remaining embedded within the fuel bed. Immediately after the valve 202 is moved into such position as to insure upward movement of the poker the operating mechanism functions to cause relative rotation of the top and body portion of the producer. If for any reason the poker should be in lowered position at this time, it is obvious that as the top and body portion of the producer move relative to each other the poker would be dragged through the fuel bed, with a probable bending of the poker, and, perhaps, such damage to the mechanism as would make necessary a complete shut-down thereof. Or perhaps with the poker in lowered position, the valve 202 might fail to move into position for imparting to the poker upward reciprocation. In this case the same damages might result.

In the apparatus as described provision is made for preventing, at all times, the rotation of the top and body portion of the producer relative to each other so long as the poker remains in lowered position. Suppose, as set forth above, the poker should for some reason stick in lowered position, although the valve 202 had been moved into the position shown in Fig. 12, which would normally result in upward reciprocation of the poker. The movement of the valve 202 into the position shown in Fig. 12 results from rotation of the cam 253 as the cylinder 65 travels towards the right. By the time the cylinder 65 has reached the end of its travel towards the right the poker should be in elevated position, and completely out of the fuel bed. As the cylinder approaches the end of its travel to the right the member 129, carried thereby, contacts with the stop nut 119 to cause reciprocation of the pilot valve 123. This movement of the pilot valve, because of the arrangement of the link mechanism connecting the rod 128 to the valve stem 125, will be such as to admit pressure steam to the right hand end of the piston valve 117, to move that valve towards the left, thus connecting the passage 114 and the passage 110 leading into the right hand end of the cylinder 61, to move the piston 62, and at the same time the cylinder 65, towards the left, thus causing rotation of the turret 172 and rotation of the top of the producer. If the poker is moved into its uppermost position following the movement of the valve 202 to the position shown in Fig. 12 the movement of the piston 62 will precede in this normal order. But as described above the passage 228 is connected through the pipe 230 to the space within the diaphragm 238 of the valve 231. So long as the passage 228 is connected to pressure steam the valve member 234 will be held upon its seat, the parts of the valve being so proportioned that the pressure of the steam within the diaphragm 238 will be sufficient to hold the valve upon its seat against upward pressure of the operating steam within the passage 111, which steam is exerted upon the lower face of the valve 234 through the pipe 237. And when the piston is in uppermost position, and the valve 202 is in the position shown in Fig. 12 the space within the diaphragm 238 will be connected to pressure steam. And with the parts as arranged in Fig. 12 it is evident that the passage 228 is connected to pressure steam through the passages 223 and 226 which are connected to the interior of the cylinder, beneath the piston 182, the interior of the cylinder, beneath the piston 182, being in turn connected to the passage 201 through the passages 220 and 219. So long as the parts are thus properly positioned the valve 234 will be held firmly upon its seat, and the admission of pressure steam to the right end of the passage 111 will cause actuation of the piston valve 117 with a consequent movement of the piston 61 within the cylinder 60, as described. Suppose, however, that the valve 202 has moved to the position shown in Fig. 12, but that the poker, and the piston 182 carried thereby, has stuck in lowered position. When so arranged the passage 225 will be connected to the interior of the cylinder above the piston 182, and thus, through the passage 218, to the exhaust passage 216. That is to say, with the valve 202 in the position shown, and with the poker stuck in lowered position, the space within the diaphragm 238 will be connected to exhaust. This will relieve the pressure tending to hold the valve 234 upon its seat and consequently any pressure steam admitted to the end of the passage 111 will escape through the pipe 237, the valve seat 233 and out through the port 235, and will not cause movement of the piston valve 117 to connect the cylinder 60 with the passage 114.

A whistle 236 is preferably connected to the port 235, so that as steam escapes through such port a signal will be sounded to warn the operator of the producer that the device is not functioning properly. And this whistle will continue to sound so long as the parts remain in the position described. By means of this construction not only is rotation of the top and body portion of the producer relative to each other prevented so long as the poker remains within the fuel bed but in addition a signal is sounded so that the operator may be warned that this condition obtains.

Suppose that, instead of the poker sticking, the valve 202, should for some unusual reason fail to move into lowermost position, which is the position adapted to cause movement of the poker out of the fuel bed. That is suppose the valve should stick in uppermost position, with the poker held in its lowermost position. At such time the passage 228 will be connected through the passage 240 and groove 241 to the passage 226, which is in turn connected to the exhaust. The space within the diaphragm 238 is thus connected to the exhaust so that actuation of the operating mechanism is prevented and the signal is at the same time sounded.

As the device is illustrated the turret is rotated upon the top, and the top and body are rotated relative to each other upon movement of the cylinder 65 and piston 61, to the left. Therefore the valve 231, and whistle 236, are connected to the right hand end of the passage 111. If actuation of the turret, and of the top and body relative to each other, occurred upon movement of the cylinder 65 and piston 61, to the right the valve and whistle would be connected to the other, or left end of the passage 111.

A pipe 260 is provided connecting the lower end of the cylinder 177 to the upper end thereof, the upper end of this pipe opening into the cylinder in such wise that it is connected to the grooves 248, when the piston is in uppermost position. Located within this pipe is a control valve 261. When the valve 261 is open the pressure steam within the cylinder will force the condensation water out through the pipe 260, into the hollow poker, to cool the lower end of the poker.

As shown the turret 172, which carries the poker mechanism proper, is eccentrically mounted upon the top of the producer. Also the poker mechanism proper is so mounted upon the turret that it is inclined to the vertical, that is to say the longitudinal axis of the poker, or the line of travel of the poker as it reciprocates, is at an angle to the vertical. The center of rotation of the turret lies substantially in the longitudinal axis of the poker so that, because of the inclination of the poker, rotation of the turret causes, what is in effect, oscillation of the poker about the center of rotation of the turret. As the turret rotates, and the top and body portion of the producer also rotate relative to each other the poker is thus caused to agitate various parts of the fuel bed, the construction being such that, during one complete revolution of the top and body portion of the producer relative to each other the poker will uniformly agitate the entire fuel bed. In actual practice the device is constructed and operated so that during one complete revolution of the top relative to the body portion the poker will pass at least once through each square foot of surface of the fuel bed. By decreasing or increasing the speed of operation of the apparatus the degree of agitation caused by the poker may be varied within wide limits.

Inclining the poker also prevents the blowing of the condensation water from its interior as steam is generated in the lower end thereof. Inasmuch as the turret, and the poker mechanism proper carried thereby, rotate relative to the top, the various pipes, and other parts carried by the top, connected to the poker mechanism are so arranged that such rotation may readily take place. As shown the piston valve 202 is so arranged that the longitudinal axis thereof passes through the center of rotation of the turret, that is the point about which the poker mechanism swings or oscillates. The valve 202 is cylindrical, and the passage 201 within which it reciprocates is also cylindrical. Rotation of the valve relative to the passage 201 may therefore take place. The valve is normally held against rotative movement, and as the turret rotates, carrying the poker with it, the poker mechanism tends to revolve about the valve.

Also the fuel feeding mechanism is eccentrically mounted upon the top of the producer, and this mounting coupled with the distributor member shown insures a substantially uniform distribution of fuel over the entire fuel bed.

In Fig. 14 is shown a slightly different form of support for the producer top. In the form of support shown in Fig. 1 the entire top, with all of the mechanism carried thereby, is supported by a single roller bearing carried by a frame-work, through which the entire weight is transmitted to the foundation of the producer, the body portion of the producer being called upon to support none of this weight. In the modification shown in Fig. 14 the entire weight of the top, and the parts carried thereby, is supported by the body portion of the producer.

Rigidly attached to the top are a plurality of uprights 300, three of these uprights preferably being used. Mounted upon each of these uprights is a roller 301 adapted to cooperate with a track 302 upon the upper end of the body portion of the producer. Extending between the upper ends of these uprights are cross members 303 from which is supported so much of the mechanism as is not directly mounted upon the top. In this construction the entire weight of the top and parts associated therewith is transmitted to the body of the producer by the rollers 301. So far as structural details and method of operation are concerned this modification does not differ materially from that heretofore described. Obviously certain mechanical changes are made necessary because of the different method of support for the top, for example the roller bearing shown in Fig. 1 for supporting the various parts of the top is dispensed with, the weight borne by this bearing being supported by the rollers 301. Also the exhaust steam from the poker is passed into a condenser 304, the water in the condenser serving for cooling purposes. Part of the exhaust steam from the engine is also led to this condenser, by pipes not shown, another part being passed through a pipe 305 which opens through the hopper member of the fuel distributing mechanism to introduce steam into each pocket of the rotatable member as it registers with the opening 132. Thus each pocket is filled with steam to exclude gas therefrom, to thus prevent the escape of such gas through the fuel feeding mechanism. But the method of operation of the device is substantially the same as that described above.

In Fig. 15 is shown a modified form of mechanism for controlling actuation of the poker and for so controlling rotation of the top and body portion relative to each other that there will be no relative movement by these parts when the poker is within the fuel bed. In this modified form of apparatus the poker mechanism is substantially identical with the mechanism heretofore described and only so much thereof is illustrated as is needed for showing the modified form of valve mechanism. Pressure steam is supplied through a pipe 400 which opens into two branch pipes, one of which 401 is adapted to supply operating steam to the poker mechanism proper and the other 402 to supply operating steam to the valve mechanism of the cylinder 60. The pipe 401 leads into a passage 403 within the member 404 which is rigidly attached to the top of the producer. The passage 403 is connected through a swivelled connection 405 to the pipe 415 which opens into the passage 220$^a$ of the poker. As shown the swivelled connection 405 consists of a ball and socket joint, but other types of swivel connections may be used if desired. The member 404 at one end has an outstanding flange 406. Rotatably mounted upon the member 404, and in sliding contact with one face of the flange 406 is a disc 407 which is held in position by means of a collar 408 keyed upon the member 404. Within member 404 is a passage 409 which opens, through that face of the flange 406 which contacts with the rotatable member 407, into a circular groove 410, provided in the face of the member 407, so that it will always register with the end of the passage 409. The groove 410 is connected to a passage 411 within the member 407. Passing through the collar 408 is a passage 412 which connects to a circular groove 413 in the member 407, the arrangement of this groove being such that the passage 412 is continuously in register therewith. Connected to the groove 413 is a passage 414 within the member 407. Carried by the poker cylinder 177$^a$ is a valve casing 420 having a passage 421 therein, within which is mounted a piston valve 422. This valve 422 has three spaced enlargements 423, 424 and 425. Leading into the passage 421 is a passage 430 which is connected through the passage 431 to the passage 220$^a$ and thus to pressure steam. Leading into the passage 421 is another passage 432 which connects the passage 421 to the space within the cylinder. Also connecting the cylinder with the passage 421 is a passage 433. Leading off from the passage 421, intermediate the passages 432 and 433 is an exhaust passage 434. Also leading off from the passage 421 is another passage 435 which also opens into the exhaust, through the passage 434. Leading off from the passage 421 is a passage 436 which is connected, through a pipe 437 to the space within the diaphragm 238 of the valve 231. Opening into the passage 421, below the enlargement 425 is a passage 440 which is connected by means of the pipe 441 to the passage 411 within the member 407, and through the passage 409 and pipe 442 to the valve casing 443. Located within the valve casing 443 is a piston valve 444, the lower end of which is attached to a cam roller 445, adapted to cooperate with the cam 253$^a$. Leading into the casing 443, and opening into one end thereof, is a pipe 446 which is connected at its other end to steam supply pipe 402. This pipe is so arranged that pressure steam is at all times exerted against the valve 444 to hold the cam roller 445 against the cam 253$^a$. Leading out of the casing 443 is a pipe 447 which is connected to the exhaust. A spring 450 is provided within the passage 421 for normally urging the valve 422 towards the end of the passage 421 into which the passage 440 opens. The member 407 and the cooperating faces of the flanges 406 and collar 408 are provided with grooves 451 constituting a labyrinth packing to prevent leakage of steam between these contacting faces.

In the operation of this device the member 404 is normally stationary and the member 407, which is connected to the poker mechanism by means of pipes 437 and 441, rotates relative thereto. The member 404, as is the case with the valve 202 described above is so positioned that the poker mechanism and cooperating parts will revolve thereabout. The valve 444 is normally held in the position shown. When in this position the pipe 442 connects the lower end of the passage 421, beneath the valve 422, to the exhaust, so that the spring 450 holds the valve in such position that the cylinder 177$^a$ above the piston 182$^a$ is connected to exhaust through the passage 433. At the same time the space within the cylinder beneath the piston 182$^a$ is connected to pressure steam through the passage 220$^a$ the space within the dash-pot, which is similar in structure and function to the dash-pot described above, being also connected with pressure steam at this time. The pipe 437 is also connected to pressure steam with the valve thus positioned, through the passages 436, 421 and 432, and the valve 234 is thus held firmly against its seat to permit reciprocation of the piston 61, and cylinder 65, to cause rotation of the turret, carrying the poking mechanism proper, and of the top of the producer. As soon as the cam 253ª is moved to such position that the depression therein is brought under the cam roller 445 the steam pressure within the casing 443 causes the valve 444 to move to shut off connection between the pipes 442 and 447 and connect the pipe 442 to pressure steam through the pipe 446. This pressure steam is immediately exerted against the enlargement 425 of the valve 421 to move that valve into uppermost position. When moved into this position the passage 430 is connected to the passage 433 and pressure steam is thus admitted to the cylinder above the piston 182ª to force that piston down. At the same time the passage 436 is connected to the exhaust through the passage 435 so that if for any reason the poker sticks in lowered position, or the valve 421 sticks in elevated position, there can be no rotation of the top and body portion of the producer relative to each other. The whistle 236 shown in Fig. 5 is also intended to be connected to this form of mechanism. The operation of the poker is substantially the same as the operation heretofore described. In this type of apparatus, however, the mechanical means for actuating the valve which controls the operation of the poker, and prevents rotation of the top under certain conditions, is dispensed with a means provided whereby that valve is actuated by steam.

The apparatus described above lends itself to very effective operation, and to the generation of a gas of better characteristics than that normally secured from the producers heretofore in general use. Heretofore producers have been divided into two general classes,—those using a comparatively shallow fuel bed, agitated by moving a stirring member bodily therethrough, and those using a comparatively thick fuel bed, agitated by means of a poker. The former of these types of producers has been primarily adapted for the production of so called "hot gas," substantially the entire fuel bed, during operating, being incandescent, and little or no attempt being made to purify the gas before use. Producers of the latter type are the so called clean gas producers. In producers of this type the fuel bed is comparatively much thicker than in the hot gas producer, the fuel bed in a clean gas producer being normally about five or six feet in thickness. Of course, with a fuel bed of this thickness the entire fuel bed is not maintained in a state of incandescence, but, in addition to the layer of ash which is present in greater or less quantity adjacent the grate, the active fuel bed is divided, horizontally, into an oxidizing or combustion zone A, a reducing zone B and a distillation zone C, the oxidizing and reducing zone being both incandescent and the distillation zone preferably not incandescent.

With all types of producers one of the most serious problems in operation is to maintain a uniform resistance to the passage of the blast through the fuel bed. In a hot gas producer this is not of as much importance as in the clean gas producer, for the whole fuel bed is incandescent. Therefore, the gas evolved leaves the fuel bed at a very high temperature. But with the clean gas producer, where a non-incandescent distillation zone is to be maintained, the temperature of the gases as they leave the fuel bed are materially lower than the temperature of the gas evolved in a hot gas producer. If resistance to draft through the fuel bed is not maintained substantially uniform channels or chimneys will be burned through the fuel bed thus preventing the maintenance of the three horizontal zones spoken of above, not only permitting the passage of air entirely through the fuel bed without its having reacted with the fuel bed to form gas, but in addition, because of extending the oxidation or combustion zone upwardly into the reduction, and bringing greater or less quantities of the fuel within the distillation zone to a state of incandescence, will greatly increase the offtake temperatures. In a clean gas producer, it is very desirable that the offtake or top temperature of the gas be maintained quite low, as compared to the offtake temperature of a hot gas producer, this offtake temperature having a very material effect upon the character of gas generated, and upon the proper cleaning of that gas.

The apparatus described above is adapted to maintain these desirable fuel bed conditions during operation of the producer. The fuel feeding mechanism, during normal operation of the producer, distributes the fuel uniformly over the fuel bed, the ashes from the consumed fuel being removed from time to time, the depth of the fuel bed being thus maintained substantially constant. The poker mechanism is adapted, during normal operation, to uniformly agitate the fuel bed. Under normal conditions the apparatus described herein will, therefore, maintain the fuel bed in substantially uniform horizontal zones, that is, the combustion or oxidation zone, the reduction zone and the distillation zone will be, normally, uniformly defined. Actual use of a producer such as described has demonstrated that it will produce a gas of much better character, and of substantially higher heat value, than a corresponding producer, operating on similar fuel, but having other means for maintaining the fuel bed in uniform condition. And in addition, it will permit of a higher rate of gas generation, or of gasification of the fuel, without any increase in the top or offtake temperature of the gas, and, in fact, with a lower top temperature than has been heretofore the case. Heretofore a high gasification rate, which in the art is also referred to as a high driving rate, has been normally secured in hot gas producers in which a comparatively thin fuel bed is used, and has been attended by high top temperature. The clean gas producer which has operated with a thicker fuel bed and with a comparatively low top temperature also had a lower gasification rate. So far as known, no gas producer has heretofore operated at a high gasification rate and low top temperature, for the existing types of producers did not permit of maintaining the fuel bed in that condition of uniformity which is necessarily prerequisite to a high driving rate and a low top temperature. The apparatus described has however permitted operation of a producer at a higher driving rate than that heretofore attained with clean gas producers, while at the same time permitting the maintenance of a lower top temperature than has heretofore been attained. And the method of gas generation which is made possible by a producer of this type has not only permitted a higher gasification rate with a lower top temperature, but has also permitted the generation, from a definite fuel, of a gas of higher heat value than is secured from the same fuel in the heretofore existing types of producers.

While the apparatus described, when functioning normally, will maintain the desired uniformity in the fuel bed—conditions sometimes arise when uniform distribution of the fuel and uniform agitation of the fuel bed will not maintain this desired condition. For this reason means are provided so that the top may be brought to rest and either the fuel feed or the poker, or both, operated, so as to distribute any desired quantity of fuel to a certain desired spot or to poke the fuel as desired in any desired spot. To stop rotation of the producer while allowing the fuel feed and poker to function it is merely necessary to hold the pawl 92 out of register with the teeth 93. If it is desired to poke a particular spot in the fuel bed the top is brought to rest with the poker properly positioned with relation to such spot, the pawl 100 is latched out of register with the teeth on the turret 172, and the poker allowed to function. If it is desired to feed fuel to a particular spot in the producer the top is rotated to position the fuel feed over any desired part of the fuel bed and the fuel feed then operated while the top remains stationary. Thus the desired condition of uniformity may be attained and the producer operated in such wise as to give those conditions which permit of very effective gas generation.

While the method herein described, and the forms of apparatus for carrying this method into effect, constitute preferred embodiments of the invention, it is to be understood that the invention is not limited to this precise method and forms of apparatus, and that changes may be made in either without departing from the scope of the invention which is defined in the appended claims.

I claim:

1. A gas producer comprising in combination, a body portion, adapted to contain a fuel bed; a top therefor; means for rotating said body portion and top relative to each other; a poker carried by said top; and means for moving said poker into and out of the fuel bed; the body portion, the top and the poker having provisions whereby the body portion and the top are relatively stationary during such time as the poker is within the fuel bed.

2. A gas producer comprising in combination, a stationary body portion, adapted to contain a fuel bed; a rotatable top therefor; means for rotating said top; a poker carried by said top; and means for moving said poker into and out of the fuel bed; said rotating means and means for operating the poker being cooperatively connected so that the body portion and top portion are held stationary relative to each other when the poker is within the fuel bed.

3. A gas producer comprising in combination, a stationary body portion, adapted to contain a fuel bed; a rotatable top therefor; means for rotating said top; a poker carried by said top, means for moving said poker into and out of the fuel bed; and other means associated with the poker moving means and said rotating means adapted to render said rotating means inoperative when the poker moving means fails to move the poker out of the fuel bed.

4. A gas producer comprising in combination, a stationary body portion, adapted to contain a fuel bed; a rotatable top therefor; means for rotating said top; a poker carried by said top; means for moving said poker into and out of the fuel bed; and means for automatically preventing rotation of said top while the poker is within the fuel bed.

5. A gas producer comprising in combination, a body portion, adapted to contain a fuel bed; a rotatable top therefor; means for rotating said top and body portion relative to each other; a poker carried by said top; means for moving said poker into and out of the fuel bed; and means associated with said rotating means and said poker moving means, to maintain said rotating means inoperative while the poker is within the fuel bed.

6. A gas producer comprising in combination, a body portion, adapted to contain a fuel bed; a top therefor; means for rotating said top and body portion relatively to each other; a rotatable turret mounted upon said top and carrying a reciprocable poker; operating mechanism carried by said top and adapted for rotating the top and body portion relatively to each other, said mechanism being also adapted for rotating the turret relative to the top; and means for rendering the operating mechanism inoperative to move the top and body portion relative to each other during such time as the poker is within the fuel bed.

7. A gas producer comprising in combination, a body portion, adapted to contain a fuel bed; a top therefor, said body portion and top being rotatable relative to each other; a rotatable turret carried by said top, a reciprocable poker carried by said turret; a fuel feeding mechanism carried by said top and comprising a rotatable distributing member; and operating mechanism carried by said top, said mechanism being adapted to rotate the top and body portion relative to each other, and to also rotate either the distributing member of the fuel feeding mechanism, or the said turret, but not to rotate both the distributing member and the turret at the same time.

8. In a gas producer, the combination with a body portion and a top therefor; a fuel feeding mechanism carried by the top, and comprising a rotatable distributing member; a rotatable turret carried by the top, and having mounted thereon a reciprocable poking mechanism; and an operating mechanism carried by the top adapted to alternately rotate the distributing member and the turret.

9. In a gas producer, the combination with the top thereof; of a fuel feeding mechanism carried by said top, said mechanism comprising a rotatable member having peripheral teeth thereon, a distributing member carried by said rotatable member; a rotatable turret, having mounted thereon a poking mechanism, said turret having teeth thereon; and an operating mechanism comprising a reciprocable member movable between the distributing member and the turret, said reciprocating member carrying two pawls, one adapted to engage the teeth associated with the distributing member and the other the teeth on the turret, whereby the distributing member is rotated when the reciprocable member is moving in one direction and the turret is rotated when the reciprocating member is moving in the other direction.

10. A gas producer comprising in combination, a body portion, adapted to contain a fuel bed; a rotatable top therefor; fuel feeding mechanism carried by said top and having a rotatable distributing member therein; a rotatable turret carried by the top and having a poking mechanism mounted thereon; and operating mechanism carried by the top, said mechanism being adapted to rotate the top and turret together, and the distributing member alone.

11. A gas producer comprising in combination, a body portion adapted to contain a fuel bed; a rotatable top therefor; a fuel feeding mechanism mounted on said top, comprising a rotatable member having peripherial teeth thereon, and a distributing member carried by said rotatable member; a rotatable turret on the top, carrying poking mechanism, and having peripherial teeth thereon; a shaft mounted upon the top, a pawl eccentrically pivoted to said shaft, a toothed rack carried by said body portion with which said pawl cooperates; operating mechanism mounted upon the top, said mechanism comprising a reciprocable, steam driven, engine, having a plurality of pawls on an extension of the piston rod thereof, said piston rod having also driving connection with said shaft to cause oscillation thereof; the operating mechanism being so mounted that the piston rod is located intermediate the fuel feeding mechanism and the rotatable turret, whereby during operation the rotatable turret and top will be actuated as the piston reciprocates in one direction, and the distributing member will be actuated as the piston moves in the other direction.

12. A gas producer comprising in combination, a body portion, adapted to contain a fuel bed; a top therefor, said body portion and top being rotatable relative to each other; means for causing movement of the top and body portion relative to each other; a reciprocable poker carried by the said top; means for moving said poker into and out of the fuel bed; and means for maintaining the rotating means inoperative for varying the position of the top and body portion relative to each other during the entire up and down movement of the poker.

13. A gas producer comprising in combination, a body portion, adapted to contain a fuel bed; a rotatable top therefor; a fuel feeding mechanism carried by said top and comprising a rotatable distributing member; a reciprocable poker carried by said top; means for moving said poker into and out of the fuel bed; means for rotating said top and said distributing member; the poker moving means and rotating means being so operatively combined that the poker is actuated only when the top is stationary.

14. A gas producer comprising in combination, a body portion, adapted to contain a fuel bed; a rotatable top therefor; fuel feeding mechanism comprising a rotatable distributing member, eccentrically mounted on said top; and a rotatable turret, carrying a reciprocable poker mechanism, eccentrically mounted on said top.

15. A gas producer comprising in combination, a body portion, adapted to contain a fuel bed; a rotatable top therefor; a rotatable turret eccentrically mounted on said top, said turret having a poker mechanism carried thereby, and rigidly mounted thereon in such position that the longitudinal axis of the poker is inclined to the vertical; means for bodily reciprocating the poker along its longitudinal axis; and means for rotating the top and the turret.

16. A gas producer comprising in combination, a body portion, adapted to contain a fuel bed; a rotatable top therefor; a rotatable turret eccentrically mounted on said top, a poker mechanism rigidly mounted on said turret in such position that the longitudinal axis of the poker is inclined to the vertical, means for causing bodily reciprocation of said poker along its longitudinal axis; and operating mechanism carried by the top and adapted for rotating the top and the rotatable turret; whereby during operation the poker will uniformly agitate the entire fuel bed during one complete rotation of the top.

17. A gas producer comprising in combination, a body portion, adapted to contain a fuel bed; a rotatable top therefor; a rotatable turret carried by said top, a reciprocable poker mounted on the turret, pressure operated means for moving said poker into and out of the fuel bed; pressure operated mechanism carried by the top and adapted to rotate the top and said turret; both said means being operated from a given source of pressure fluid; and means for rendering inoperative said pressure operating mechanism for rotating the top and turret without affecting the operation of the poker.

18. A gas producer comprising in combination, a body portion, a rotatable top; an overhead supporting frame-work supported independently of said body portion; a single roller bearing carried by said frame-work, and means for attaching said top to, and sustaining it from, said bearing.

19. A gas producer comprising in combination, a body portion, a rotatable top; an overhead supporting frame-work, carried by the producer foundations independently of said body portion; a roller bearing carried by said frame-work, and means for attaching said top to, and sustaining it from, said bearing; and sway rollers carried by the top and adapted to cooperate with the body portion of the producer, said rollers being adapted to sustain any unbalanced weights upon the top.

20. In a gas producer, a body portion; a top therefor, said top and body portion being rotatable relative to each other; a liquid seal for preventing leakage into or out of the producer between the top and body portion, and means coacting with said seal for preventing the blowing of such seal during operation.

21. In a gas producer, a body portion; a top therefor, said top and body portion being rotatable relative to each other; a liquid seal for preventing leakage into or out of the producer between the top and body portion, said seal comprising a trough for containing a liquid and a partition depending thereinto, the liquid upon opposite sides of said partition being, during operation, subjected to different pressures; and means for preventing blowing of said seal as a result of such different pressures.

22. In a gas producer, a body portion; a top therefor, said top and body portion being rotatable relative to each other; a liquid seal for preventing leakage into or out of the producer between the top and body portion, said seal comprising a trough for containing a liquid and a partition depending thereinto, the liquid upon opposite sides of said partition during operation being subjected to different pressures, an overflow from the trough outside the partition, and means for subjecting the liquid within the overflow to the same pressures as the liquid within the trough inside the partition.

23. In a gas producer, a body portion; a top therefor, said top and body portion being movable relative to each other; a liquid seal for preventing leakage between said top and body portion, said seal comprising a trough for containing a liquid and a partition having its lower edge immersed in said liquid, the liquid in the trough on one side of the partition being subject to atmospheric pressure and the liquid in the trough on the other side of the partition being subjected to the pressure within the producer; a trap connected to the trough, an overflow within said trap, and means for connecting the inside of the trap to the inside of the producer, so that the pressures within the trap will be the same as the pressures within the producer.

24. In a gas producer having a liquid seal consisting of a trough containing a liquid and a partition depending into said liquid, the liquid on opposite sides of said partition being subjected during operation of the producer to different pressures; a trap having an overflow partition therein, means for connecting the space within the trap to one side of the overflow with the trough to one side of the depending partition; an outlet leading from the space within the trap upon the other side of the overflow; and means for connecting the space within the trap upon both sides of the overflow, to the trough upon the other side of the depending partition.

25. A gas producer comprising, in combination, a body portion adapted to contain a fuel bed, a track carried by said body portion; a rotatable top for said body portion; an overhead supporting frame work; means for attaching said top to, and rotatably supporting it from, said frame work; and sway rollers carried by said top and positioned for cooperation with the said track.

26. A gas producer comprising, in combination, a body portion adapted to contain a fuel bed, a rotatable top therefor; an overhead supporting frame work; means for attaching said top to, and rotatably supporting it from, said frame work; an engine carried by said top for causing rotation thereof, a pipe connected to said engine; a pipe leading from a supply of pressure fluid, said pressure supply pipe being attached to and supported by the said overhead frame work; and means, for connecting the two said pipes, whereby rotation of said top will not interfere with the supply of pressure fluid to the said engine.

27. A gas producer comprising, in combination, a body portion adapted to contain a fuel bed, a rotatable top therefor; an overhead supporting frame work, a roller bearing carried by said frame work, means for attaching the said top to, and supporting it from, the said roller bearing; an engine for causing rotation of the said top, and a pipe connecting said engine to a suitable source of supply of pressure fluid for causing operation thereof, the said pipe being attached to and supported by the roller bearing in such wise that rotation of the top will not interfere with the operation of the engine.

28. A gas producer comprising, in combination, a body portion adapted to contain a fuel bed, a rotatable top therefor; an overhead supporting frame work, a roller bearing carried by said frame work, and so positioned that it is substantially coaxial with the body portion and top of the producer; fluid pressure operating mechanism mounted upon the said top, a pipe connected to a source of supply of pressure fluid, a pipe attached to and supported by the said roller bearing, and a swivelled joint connecting the two said pipes so that rotation of the top will not interfere with the supply of pressure fluid to the operating mechanism.

29. A gas producer comprising, in combination, a body portion adapted to contain a fuel bed, a water cooled top therefor; an overhead supporting frame work, a roller bearing carried by said frame work, means for attaching said top to, and supporting it from, said frame work; a circular trough carried by said roller bearing and adapted to receive water from any suitable source of supply, and a pipe connecting said trough to the water cooled top to supply cooling water to said top.

30. A gas producer comprising, in combination, a body portion adapted to contain a fuel bed, a rotatable water cooled top therefor, an overhead supporting frame work, a roller bearing carried by said frame work, and comprising a stationary race member attached to said frame work and a rotary race member cooperating with said stationary member; means connecting said rotary race member to the said top; a circular trough carried by the rotary race member, a water supply pipe having the free end thereof positioned to discharge water into said trough, and a pipe connecting said trough to the said top to supply cooling water thereto.

31. A gas producer comprising, in combination, a body portion adapted to contain a fuel bed, a top portion therefor, the body portion and the top being rotatable relative to each other; a rotatable turret carried by said top and eccentrically positioned with respect thereto, an inclined poker carried by said rotatable turret; a pipe carried by said top and stationary with respect thereto for supplying pressure fluid to said poker to cause operation thereof; and a swivelled connection between said pipe and said poker, whereby as the turret rotates the poker mechanism turns about the said swivelled connection.

32. A gas producer comprising, in combination, a body portion adapted to contain a fuel bed, a top therefor, means for rotating the top and body portion relative to each other; a rotatable turret carried by said top, and eccentrically mounted with respect thereto, an inclined poker carried by said turret and rigidly attached thereto, whereby as the turret rotates the upper end of the poker mechanism will travel in a circular path; a pipe carried by the top and connected to a source of supply of pressure fluid for operating the poker mechanism; means carried by the said poker mechanism and adapted for connection to the said pipe, the connection comprising a swivelled joint, so positioned that as the turret rotates the upper end of the poker will travel about said swivelled connection as a center.

33. A gas producer comprising, in combination, a body portion adapted to contain a fuel bed, a rotatable top therefor; an overhead supporting frame work, a roller bearing carried by said frame work, comprising a stationary race member, attached to said frame work, and a rotatable race member cooperating with said stationary race member, means connecting the rotatable race member to the top, to support said top; operating means carried by the said top, a pipe connecting said operating means to the rotatable race member, said pipe being adapted to move with the top; a second and stationary pipe connected to a suitable source of supply of pressure fluid, and means connecting the end of said second and stationary pipe to the end of the first named pipe, comprising a swivelled joint positioned substantially coaxial with the rotatable race member.

34. A gas producer comprising, in combination, a body portion adapted to contain a fuel bed, a rotatable top therefor, having positioned thereon a fuel feeding mechanism, an agitating mechanism and apparatus for operating the top, the fuel feeding mechanism and the agitating mechanism; an over head frame work supported independently of the body portion of the producer, and means for attaching said top to, and rotatably supporting it from, the overhead frame work, whereby substantially all the weight of the top, and its associated parts is sustained by the overhead frame work.

35. A gas producer comprising in combination, a body portion adapted to contain a fuel bed; a top therefor; a rotatable turret member mounted on said top, a poker mechanism carried by said turret having a poker carried eccentrically of said producer top, and means for bodily reciprocating the poker along its longitudinal axis into and out of the fuel bed.

36. A gas producer comprising in combination, a body portion adapted to contain a fuel bed; a top therefor; a rotatable turret member mounted on said top; a poker carried by said turret, the longitudinal axis of said poker being inclined with respect to the vertical axis of the turret, and means for bodily reciprocating said poker along its longitudinal axis.

37. A gas producer comprising in combination, a body portion adapted to contain a fuel bed; a rotatable top therefor; a rotatable turret eccentrically mounted on said top; a poking mechanism carried by said turret, and means for bodily reciprocating the poker along its longitudinal axis to effect agitation of the fuel bed.

In testimony whereof I hereto affix my signature.

HARRY F. SMITH.